United States Patent
Sun et al.

(10) Patent No.: US 11,785,646 B2
(45) Date of Patent: *Oct. 10, 2023

(54) METHODS AND APPARATUS FOR TRANSMITTING AND RECEIVING UPLINK CONTROL INFORMATION AND FOR REQUESTING RANDOM ACCESS IN WIRELESS COMMUNICATION SYSTEM

(71) Applicant: Samsung Electronics Co., Ltd., Suwon-si (KR)

(72) Inventors: Feifei Sun, Beijing (CN); Di Su, Beijing (CN); Jingxing Fu, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,074

(22) Filed: Jan. 26, 2022

(65) Prior Publication Data

US 2022/0150978 A1 May 12, 2022

Related U.S. Application Data

(63) Continuation of application No. 16/636,803, filed as application No. PCT/KR2018/009010 on Aug. 8, 2018, now Pat. No. 11,272,546.

(30) Foreign Application Priority Data

Aug. 8, 2017 (CN) .......................... 201710670026.0
Aug. 10, 2017 (CN) .......................... 201710681936.9

(Continued)

(51) Int. Cl.
*H04W 74/08* (2009.01)
*H04L 5/14* (2006.01)
(Continued)

(52) U.S. Cl.
CPC ....... *H04W 74/0833* (2013.01); *H04L 5/1469* (2013.01); *H04W 4/80* (2018.02);
(Continued)

(58) Field of Classification Search
CPC ............. H04W 80/02; H04W 72/0453; H04W 74/0833; H04W 4/70; H04W 4/80;
(Continued)

(56) References Cited

U.S. PATENT DOCUMENTS 10,389,496 B2    8/2019  Hwang et al.
2012/0147844 A1*  6/2012  Kim ...................... H04L 5/0037
                                                                 370/329

(Continued)

FOREIGN PATENT DOCUMENTS

CN    106982110 A    7/2017
EP    3 367 601 A1   8/2018
(Continued)

OTHER PUBLICATIONS

Huawei et al., "PUCCH coverage enhancement", 3GPP Draft, R1-153761, 3rd Generation Partnership Project (3GPP), vol. RAN WG1, Beijing, China, Aug. 24, 2015-Aug. 28, 2015, Aug. 23, 2015, XP051039340, Retrieved from the Internet: URL: http://www.3gpp.org/ftp/Meetings_3GPP_SYNC/RAN1/Docs/ [retrieved on Aug. 23, 2015].

(Continued)

*Primary Examiner* — Brian D Nguyen
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). A method performed by a user equipment (UE) is provided that includes receiving, via a RRC signaling, SIB for two uplink (Continued)

carriers in one cell, the two uplink carriers including a first uplink carrier corresponding to a downlink carrier in which a downlink synchronization signal is received and a second uplink carrier, transmitting an uplink signal on one of the two uplink carriers configured to the UE.

20 Claims, 25 Drawing Sheets

(30) Foreign Application Priority Data

Nov. 16, 2017 (CN) .......................... 201711137954.7
Jan. 26, 2018 (CN) .......................... 201810078508.1

(51) Int. Cl.
| | |
|---|---|
| H04W 4/80 | (2018.01) |
| H04W 72/04 | (2023.01) |
| H04W 76/27 | (2018.01) |
| H04W 80/02 | (2009.01) |
| H04W 72/0446 | (2023.01) |
| H04W 72/0453 | (2023.01) |
| H04W 72/21 | (2023.01) |

(52) U.S. Cl.
CPC ... *H04W 72/0446* (2013.01); *H04W 72/0453* (2013.01); *H04W 72/21* (2023.01); *H04W 74/0891* (2013.01); *H04W 76/27* (2018.02); *H04W 80/02* (2013.01)

(58) Field of Classification Search
CPC ......... H04W 72/0446; H04W 74/0891; H04W 76/27; H04W 72/21; H04L 5/001; H04L 5/1469; H04L 5/0092; H04L 5/0053; H04L 5/0094; H04L 5/0098; H04L 5/005
See application file for complete search history.

(56) References Cited

U.S. PATENT DOCUMENTS

| | | | |
|---|---|---|---|
| 2014/0050181 A1 | 2/2014 | Tiirola et al. | |
| 2015/0078483 A1 | 3/2015 | Sun et al. | |
| 2015/0131569 A1 | 5/2015 | Rosa et al. | |
| 2017/0070994 A1 | 3/2017 | Rico Alvarino et al. | |
| 2017/0111106 A1 | 4/2017 | Lee et al. | |
| 2018/0007733 A1* | 1/2018 | Mochizuki | H04W 48/16 |
| 2018/0041325 A1* | 2/2018 | Lee | H04W 72/1273 |
| 2018/0077703 A1 | 3/2018 | Sun et al. | |
| 2018/0084551 A1 | 3/2018 | Shin et al. | |
| 2018/0375619 A1 | 12/2018 | Hwang et al. | |
| 2019/0007933 A1 | 1/2019 | Yi et al. | |
| 2019/0045553 A1* | 2/2019 | Zhang | H04W 56/001 |
| 2019/0380098 A1* | 12/2019 | Liu | H04W 72/04 |
| 2019/0394757 A1 | 12/2019 | Zhang et al. | |
| 2020/0145961 A1* | 5/2020 | Harada | H04W 72/044 |
| 2020/0275433 A1 | 8/2020 | Berggren | |
| 2021/0075576 A1 | 3/2021 | Gou et al. | |
| 2021/0112557 A1 | 4/2021 | Lee et al. | |
| 2021/0126749 A1 | 4/2021 | Iyer et al. | |

FOREIGN PATENT DOCUMENTS

| | | |
|---|---|---|
| KR | 10-2015-0027020 A | 3/2015 |
| KR | 10-2017-0025219 A | 3/2017 |
| WO | 2013/005972 A2 | 1/2013 |
| WO | 2016/208897 A1 | 12/2016 |
| WO | 2017/069470 A1 | 4/2017 |
| WO | 2017/076351 A1 | 5/2017 |
| WO | 2017/105158 A1 | 6/2017 |

OTHER PUBLICATIONS

Nokia Networks, "PUCCH Consideration for MTC", 3GPP Draft, R1-152546, 3rd Generation Partnership Project (3GPP), vol. RAN WG1, Fukuoka, Japan, May 25, 2015-May 29, 2015, May 24, 2015, XP050970370, Retrieved from the Internet: URL: http://www.3gpp.org/ftp/Meetings_3GPP_SYNC/RAN1/Docs/ [retrieved on May 24, 2015].
Partial European Search Report dated Jul. 6, 2020, issued in European Patent Application No. 18843724.8.
LTE; Evolved Universal Terrestrial Radio Access (E-UTRA); Medium Access Control (MAC) protocol specification (3GPP TS 36.321 version 13.3.0 Release 13), ETSI TS 136 321 V13.3.0, pp. 1-94, XP014280324 Retrieved from the Internet: URL:http://www.etsi.org/deliver/etsi_ts/136300_136399/136321/13.03.00_60/ts_136321v130300p.pdf retrieved on Oct. 14, 2016, p. 20-p. 30, p. 73-p. 74, p. 81.
LTE; Evolved Universal Terrestrial Radio Access (E-UTRA); Physical channels and modulation (3GPP TS 36.211 version 14.2.0 Release 14), ETSI TS 136 211 V14.2.0, XP055732178, Retrieved from the Internet: URL:https://www.etsi.org/deliver/etsi_ts/136200_136299/136211/14.02.00_60/ts_136211v140200p.pdf retrieved on Sep. 21, 2020, paragraph [05.7].
European Search Report dated Sep. 30, 2020, issued in European Application No. 18843724.8.
Indian Office Action dated May 31, 2021, issued in Indian Patent Application No. 202037007663.
Korean Office Action dated Jul. 20, 2022, issued in Korean Patent Application No. 10-2020-7006819.
Korean Notice of Patent Grant dated Jan. 10, 2023; Korean Appln. No. 10-2020-7006819.
European Communication dated Feb. 2, 2023; European Appln. No. 18 843 724.8-1213.
ZTE; Random access channel design for NB-IoT; 3GPP TSG RAN WG1 Ad-Hoc Meeting; R1-160056; Jan. 18-20, 2016; Budapest, Hungary.
Chinese Office action with English translation dated Apr. 19, 2023; Chinese Appln. No. 201710670026.0.
European Search Report dated Aug. 3, 2023; European Appln. No. 18 843 724.8-1213.

* cited by examiner

METHODS AND APPARATUS FOR TRANSMITTING AND RECEIVING UPLINK CONTROL INFORMATION AND FOR REQUESTING RANDOM ACCESS IN WIRELESS COMMUNICATION SYSTEM

CROSS-REFERENCE TO RELATED APPLICATION(S)

This application is a continuation application of prior application Ser. No. 16/636,803, filed on Feb. 5, 2020, which issued as U.S. Pat. No. 11,272,546 on Mar. 8, 2022, which is a U.S. National Stage application under 35 U.S.C. § 371 of an International application number PCT/KR2018/009010, filed on Aug. 8, 2018, which is based on and claims priority of a Chinese patent application number 201710670026.0, filed on Aug. 8, 2017, in the Chinese Patent Office, of a Chinese patent application number 201710681936.9, filed on Aug. 10, 2017, in the Chinese Patent Office, of a Chinese patent application number 201711137954.7, filed on Nov. 16, 2017, in the Chinese Patent Office, and of a Chinese patent application number 201810078508.1, filed on Jan. 26, 2018, in the Chinese Patent Office, the disclosure of each of which is incorporated by reference herein in its entirety.

TECHNICAL FIELD

The present disclosure relates to radio communications, and in particular to methods and apparatus for transmitting and receiving uplink control information and for requesting random access.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

The present disclosure provides methods and apparatus for transmitting uplink control information, so as to improve the uplink data rate, and efficiently perform uplink control information (UCI) transmission, especially for narrowband systems that operate in a time division duplex (TDD) frequency band and a frequency division duplex (FDD) frequency band.

Solution to Problem

To achieve the above object, the present disclosure provides the following technical solutions as below.

A method for transmitting uplink control information, including, determining, by a user equipment (UE), at least two carriers for uplink transmission in a cell currently connected by the UE, and determining a carrier for uplink control information (UCI) transmission from the at least two carriers for uplink transmission, determining, by the UE, a relative frequency-domain position and a time-domain starting position occupied by UCI on the determined carrier for UCI transmission, and retuning, by the UE, a center radio frequency of the UE to a center frequency of the carrier for UCI transmission, and transmitting the UCI according to the relative frequency-domain position and the time-domain starting position occupied by the UCI, in which, the UE receives and transmits information on one carrier at one time.

Preferably, the carrier for UCI transmission is different from a carrier used for uplink data transmission of the UE, or the carrier for UCI transmission is different from an uplink carrier corresponding to a downlink channel of the UE.

Preferably, determining, by the UE, the at least two carriers for uplink transmission includes, determining, by the UE, the at least two carriers for uplink transmission according to first signaling sent from a base station, or determining, by the UE, an uplink carrier corresponding to a downlink anchor carrier or a carrier where a random access channel is transmitted as one carrier for uplink transmission, and determining other carriers for uplink transmission according to second signaling sent from the base station or according to a predefined rule.

Preferably, determining the carrier for UCI transmission includes, determining, by the UE, the carrier for UCI transmission according to third signaling sent from the base station; in which the third signaling is configured to indicate the carrier for UCI transmission from the carriers for uplink transmission, or determining, by the UE, the carrier for UCI transmission according to the first signaling or the second signaling.

Preferably, in a circumstance where the UE determines the uplink carrier corresponding to the downlink anchor carrier or a carrier where a narrowband random access channel (NPRACH) is transmitted as one carrier for uplink transmission, and determines the other carriers for uplink transmission according to the second signaling sent from the base station or according to the predefined rule, the UE determines the carrier for UCI transmission according to the predefined rule.

Preferably, the predefined rule is: transmitting the UCI on the other carriers for uplink transmission, or transmitting the UCI on an uplink carrier corresponding to a downlink control channel of the UE.

Preferably, determining the time-domain starting position occupied by the UCI includes, determining a first valid uplink transmission position starting from an end position of a downlink data channel and satisfying a specified time offset as the time-domain starting position, in which the specified time offset is a preset minimum time offset, or the specified time offset is a time offset determined according to signaling sent from the base station.

Preferably, determining the time offset according to the signaling sent from the base station includes, directly determining one of several time offsets as the time offset, where the several time offsets are absolute time offsets, or determining one minimum time offset plus X uplink time units as the time offset, where X uplink time units are determined according to the signaling sent from the base station.

Preferably, determining the time offset according to the signaling sent from the base station includes, determining one of a time offset set according to DCI sent from the base station as the time offset.

Preferably, when the UE determines the relative frequency-domain position and the time-domain starting position occupied by the UCI, the method further includes determining a time-domain length of the UCI according to a length of one UCI transmission and the number of repetitions of the UCI, in which the length of one UCI transmission is one subframe or two slots.

Preferably, the number of repetitions of the UCI is configured through RRC.

Preferably the length of one subframe or two slots is 1 millisecond or 4 milliseconds.

Preferably, determining a valid uplink transmission position includes one of the following, determining an uplink subframe determined according to an uplink and downlink subframe configuration in a time division duplex (TDD) system as the valid uplink transmission position, determining the uplink subframe determined according to the uplink and downlink subframe configuration in the TDD system and an uplink pilot time slot (UpPTS) in a special subcarrier as the valid uplink transmission position, or determining the valid uplink transmission position according to a number of symbols contained in the UpPTS in the special subframe or according to a special subframe configuration; in which if the TDD system includes two continuous uplink subframes or an even number of continuous uplink subframes, then the uplink subframe determined according to the uplink and downlink subframe configuration in the current TDD system is determined as the valid uplink transmission position, or otherwise, the valid uplink transmission position is determined according to the number of symbols contained in the UpPTS in the special subframe or according to the special subframe configuration, determining the uplink subframe and the UpPTS in the special subframe as the valid uplink transmission position, or determining the uplink subframe as the valid uplink transmission position according to a configuration configured by signaling from the base station, determining whether respective uplink carriers and the UpPTS in the special subframe are used as the valid uplink transmission position according to a bitmap indicator carried in the signaling from the base station.

Preferably, determining the valid uplink transmission position according to the number of symbols contained in the UpPTS in the special subframe includes, if the number of symbols contained in the UpPTS is larger than a preset threshold, then determining the UpPTS and the uplink subframe as the valid uplink transmission position, or otherwise, determining the uplink subframe as the valid uplink transmission position, or if the uplink and downlink configuration in the TDD system is a specified uplink and downlink configuration, and the number of symbols contained in the UpPTS is larger than the preset threshold, then determining the UpPTS and the uplink subframe as the valid uplink transmission position, or otherwise, determining the uplink subframe as the valid uplink transmission position.

Preferably, determining the valid uplink transmission position according to the special subframe configuration comprises, if a current special subframe configuration is preset or is a specified special subframe configuration configured by the base station, then determining the UpPTS and the uplink subframe as the valid uplink transmission position, or otherwise, determining the uplink subframe as the valid uplink transmission position, or if the uplink and downlink configuration in the TDD system is a specified uplink and downlink configuration, and the current special subframe configuration is preset or is a specified special subframe configuration configured by the base station, then determining the UpPTS and the uplink subframe as the valid uplink transmission position, or otherwise, determining the uplink subframe as the valid uplink transmission position.

A method for receiving uplink control information, including, determining, by a base station, at least two carriers for uplink transmission allocated for a user equipment (UE) in a cell currently connected by the UE, and determining a carrier for uplink control information (UCI) transmission of the UE from the at least two carriers for uplink transmission, determining, by the base station, a relative frequency-domain position and a time-domain starting position occupied by UCI on the determined carrier for UCI transmission, receiving, by the base station, the UCI, on the carrier for UCI transmission of the UE, according to the relative frequency-domain position and the time-domain starting position occupied by the UCI, in which, the UE receives and transmits information on one carrier at one time.

Preferably, when the base station configures the carrier used by the UE to transmit the UCI, the base station configures carriers used by multiple users to transmit UCI as a same carrier.

Preferably, when the base station determines the time-domain starting position, the base station determines a time-domain starting position occupied by UCI of multiple UEs as a same position.

Preferably, when the base station determines the time-domain starting position, the base station determines time-domain starting positions occupied by different UCI of the UEs as a same position.

An apparatus for transmitting uplink control information, including: a carrier determination unit, a frequency-domain and time-domain determination unit and a transmission unit; in which the carrier determination unit is configured to determine at least two carriers for uplink transmission in a cell currently connected, and determine a carrier for uplink control information (UCI) transmission from the at least two carriers for uplink transmission, the frequency-domain and time-domain determination unit is configured to be use by a user equipment (UE) to determine a relative frequency-domain position and a time-domain starting position occupied by UCI on the determined carrier for UCI transmission, and the transmission unit is configured to retune a center radio frequency of the UE to a center frequency of the carrier for UCI transmission, and transmit the UCI according to the relative frequency-domain position and the time-domain starting position occupied by the UCI; in which the transmission unit transmits information on one carrier at one time.

An apparatus for receiving uplink control information, including: a carrier determination unit, a frequency-domain and time-domain determination unit and a receiving unit; in which the carrier determination unit is configured to determine at least two carriers for uplink transmission allocated for a user equipment (UE) in a cell currently connected by the UE, and determine a carrier for uplink control information (UCI) transmission of the UE from the at least two carriers for uplink transmission; in which the UCI and uplink data of the UE are transmitted on different carriers, the frequency-domain and time-domain determination unit is configured to determine a relative frequency-domain position and a time-domain starting position occupied by UCI on the determined carrier for UCI transmission, and the receiving unit is configured to receive the UCI on the carrier for UCI transmission of the UE according to the relative frequency-domain position and the time-domain starting position occupied by the UCI; in which the UE transmits information on one carrier at one time.

In addition, the present disclosure provides a method and apparatus for transmitting the center frequency of a carrier in a TDD system, which can provide a more flexible operation mode for the TDD system, and efficiently improve the utilization of radio frequency spectrum, especially for to a scenario where a narrowband system operates in inband or a guardband of a wide band system.

To achieve the foregoing object, the present disclosure uses the following solutions, A method for transmitting signals in a time division duplex (TDD) narrowband system, including, obtaining, by a UE, a first carrier of the TDD narrowband system, if an uplink or downlink carrier determined as the first carrier locates in inband or a guardband of a TDD wideband system, obtaining, by the UE, indication information of a second carrier corresponding to the first carrier, determining an offset between the first carrier and the second carrier of the TDD narrowband system according to the indication information, and calculating a center frequency of the second carrier corresponding to the first carrier according to the offset and a center frequency of the first carrier, transmitting or receiving, by the UE, signals according to the calculated center frequency of the second carrier, in which when the first carrier is an uplink carrier, the second carrier is a downlink carrier, when the first carrier is a downlink carrier, the second carrier is an uplink carrier.

Preferably, when the first carrier is a downlink carrier, the downlink carrier is an anchor carrier or a non-anchor carrier.

Preferably, the indication information of the second carrier is configured in a system information block (SIB) or a master information block (MIB).

Preferably, the indication information of the second carrier includes at least one piece of the following information: information of an offset from the center frequency of the first carrier, information of physical resource blocks occupied in the TDD wideband system, information of a relative position to the TDD wideband system, information of a cell-specific reference signal (CRS) sequence.

Preferably, the UE determining that the first carrier locates in inband or the guardband of the TDD wideband system includes: the UE determining that the first carrier is in inband or the guardband of the TDD wideband system according to one or more of the following channels or information: synchronization channel, master information block, system information block, UE-specific radio resource control (RRC) signaling, physical layer indication information, or media access control (MAC) layer indication information.

Preferably, when the first carrier is an uplink carrier, the uplink carrier obtained by the UE is an uplink carrier used for transmitting a random access channel.

Preferably, when the first carrier is a downlink carrier, and the downlink carrier obtained by the UE locates in inband of the TDD wideband system, and cell IDs of the TDD narrowband system and cell IDs of the TDD wideband system are same, the indication information of the second carrier includes information of a CRS sequence.

Preferably, the UE transmitting or receiving the signals according to the center frequency of the second carrier includes: the UE retuning a center radio frequency to the calculated center frequency of the second carrier, and transmitting or receiving the signals.

A user equipment (UE) in a time-division duplex (TDD) narrowband system, including: an obtaining unit, a calculation unit and a transmission unit; in which the obtaining unit is configured to obtain a first carrier of the TDD narrowband system, the calculation unit is configured to, if an uplink or a downlink carrier determined as the first carrier locates in inband or a guardband of a TDD wideband system, obtain indication information of a second carrier corresponding to the first carrier, determine an offset between the first carrier and the second carrier of the TDD narrowband system according to the indication information, and calculate a center frequency of the second carrier corresponding to the first carrier according to the offset and the center frequency of the first carrier, and the transmission unit is configured to transmit or receive signals according to the center frequency of the second carrier calculated by the calculation unit, in which when the first carrier is an uplink carrier, the second carrier is a downlink carrier; when the first carrier is a downlink carrier, the second carrier is an uplink carrier.

As can be seen from the foregoing technical solutions, in the present disclosure, a UE determines at least two carriers for uplink transmission in a cell currently connected by the UE, and determines a carrier for transmitting UCI from the at least two carriers for uplink transmission; in which, the UE receives and transmits information on one carrier at one time. On the determined carrier for transmitting the UCI, the UE determines a relative frequency-domain position and a time-domain starting position occupied by the UCI. The UE retunes a center radio frequency of the UE to a center frequency of the carrier for transmitting the UCI, and transmits the UCI according to the relative frequency-domain position and the time-domain starting position occupied by the UCI. In this way, the UE can support at least two uplink carriers in a same cell, so as to efficiently transmit UCI.

The preferably solutions of the present disclosure also transmit UCI and uplink data on two different uplink carriers in a cell, so as to efficiently improve the uplink data rate, especially for narrowband systems that work in a TDD frequency band and a FDD frequency band.

The solutions of the present disclosure provides a more flexible configuration for a narrowband system that works in a guardband mode or an inband mode, especially for a narrowband system where an anchor carrier and non-anchor carriers are transmitted in inband or a guardband of a wideband system, which improves the utilization of radio spectral resources and guarantees a UE having low complexity. The solutions of the present disclosure are applicable to narrowband systems that work in a TDD frequency band and a FDD frequency band, especial to a narrowband system that works in a TDD frequency band.

An objective of the present disclosure is to overcome the deficiencies in the prior art and provide a method and user equipment for requesting random access, which are applicable to TDD communication systems and can be deployed within an LTE band or an LTE guard band, which can also be used for standalone TDD NB-IoT system.

For this purpose, the present disclosure provides a method for requesting random access, comprising the following steps of, determining a time division duplex (TDD) uplink time-domain resource, determining, according to the TDD uplink time-domain resource, a time-domain resource used for transmitting a narrowband physical random access channel (NPRACH), determining a time-domain format of an NPRACH transmission group, where the time-domain format comprising: one NPRACH transmission group comprises a number of transmission units which are discontinuous in time domain, and one transmission unit comprises one or more NPRACH symbol groups which are continuous in time domain, and transmitting, on the determined time-domain resource used for transmitting NPRACH, an NPRACH transmission group in the time-domain format.

Preferably, the one transmission group comprises a number of transmission units which are discontinuous in time domain comprises: one transmission group comprises at least two transmission units which are discontinuous in time domain.

Preferably, the step of determining, according to the TDD uplink time-domain resource, a time-domain resource used for transmitting NPRACH comprises: determining a number of continuous TDD uplink time-domain sections according to the TDD uplink time-domain resource, one continuous TDD uplink time-domain section being constituted by any one of the following ways: by a number of continuous uplink subframes, or by one special subframe and a number of continuous uplink subframe(s), and the step of transmitting, on the determined time-domain resource used for transmitting NPRACH, an NPRACH transmission group in the time-domain format comprises: correspondingly transmitting, in one continuous TDD uplink time-domain section, one transmission unit in the NPRACH transmission group.

Preferably, the step of correspondingly transmitting, on one continuous TDD uplink time-domain section, one transmission unit in the NPRACH transmission group comprises: correspondingly transmitting, on one continuous TDD uplink time-domain section, one transmission unit in the NPRACH transmission group, where the end of this transmission unit being located before the end of this continuous TDD uplink time-domain section.

Preferably, the step of correspondingly transmitting, on one continuous TDD uplink time-domain section, one transmission unit in the NPRACH transmission group comprises: determining a timing advance (TA) used for correcting the time to transmit one transmission unit, and correspondingly transmitting; and according to the TA, transmitting one transmission unit of the NPRACH transmission group on one continuous TDD uplink time-domain section.

Preferably, the step of determining the TA used for correcting the time to transmit one transmission unit and correspondingly transmitting, according to the TA and on one continuous TDD uplink time-domain section, one transmission unit in the NPRACH transmission group comprises: determining the TA as Ts with m time units, and transmitting, on a UpPTS and a number of continuous uplink subframe(s) after the UpPTS, one transmission unit in the NPRACH transmission group, and correcting the time-domain starting transmission position for this transmission unit as the starting position of Ts with m time units before the UpPTS.

An ending transmission position for this transmission unit in time domain comprises: the transmission lasting until the first uplink subframe after the UpPTS, or the transmission lasting until the last one of all continuous uplink subframes after the UpPTS, or the transmission lasting for the length of one NPRACH symbol group.

Preferably, the NPRACH symbol group comprises one cyclic prefix (CP) and three to five symbols, and the total length of each symbol group is not greater than 43008*Ts, where 30720*Ts=1 ms; or, the NPRACH symbol group comprises one CP and three to six symbols, and the total length of each symbol group is not greater than 14336 Ts, where 30720*Ts=1 ms.

Preferably, the step of determining TDD uplink time-domain resource comprises, determining valid uplink subframe(s) as TDD uplink time-domain resource, wherein the valid uplink subframe(s) is(are) indicated by the received valid uplink subframe(s) configuration information; or, determining subframe(s) other than valid downlink subframe(s) as TDD uplink time-domain resource, wherein the valid downlink subframe(s) is(are) indicated by the received valid downlink subframe configuration information; or, determining uplink subframe(s) and an uplink pilot time slot (UpPTS) as TDD uplink time-domain resource, wherein the uplink subframe(s) and the UpPTS are indicated by the received uplink-downlink configuration information.

Preferably, after the step of determining the time-domain format for a NPRACH transmission group, the method comprises the step of: determining a frequency-domain position for transmitting an NPRACH transmission unit in a frequency-hopping transmission manner, where a frequency-domain resource for frequency-hopping transmission is determined by at least one of following: the configured carrier position, subcarrier group position and subcarrier position, and a frequency-hopping pattern is pre-defined or determined by a cell ID or determined by a random sequence generated by using a cell ID as a seed, and the step of correspondingly transmitting, on one continuous TDD uplink time-domain section, one transmission unit in the NPRACH transmission group comprises: transmitting, on one continuous TDD uplink time-domain section and at the determined frequency-domain position for transmitting an NPRACH transmission unit, one transmission unit in the NPRACH transmission group.

Preferably, the time-domain format further comprises: phases between two adjacent transmission units are continuous or the phases are fixed.

Preferably, the time-domain format further comprises: at least two the frequency-hopping intervals between symbols groups in the NPRACH transmission group are different.

Preferably, the step of determining a TA used for correcting the time to transmit one transmission unit comprises: determining a TA used for correcting the time to transmit one transmission unit, according to at least one of the following: received radio resource control (RRC) signaling, special subframe configuration information, uplink-downlink configuration information, a TA value corresponding to a preset NPRACH symbol group time-frequency format and a predetermined fixed TA value.

Preferably, the step of correspondingly transmitting, on one continuous TDD uplink time-domain section, one transmission unit in the NPRACH transmission group comprises: determining, according to any one of the distribution of uplink subframe(s) and special subframe(s), the number of uplink subframe(s) in a corresponding continuous TDD uplink time-domain section, and the received reference point and information to indicate the offset, the starting position in time-domain of the transmission of the first transmission unit in the NPRACH transmission group, and transmitting this transmission unit in the corresponding continuous TDD uplink time-domain section.

Preferably, the step of correspondingly transmitting, on one continuous TDD uplink time-domain section, one transmission unit in the NPRACH transmission group comprises, determining, according to any one of the received RRC signaling, the value corresponding to the preset NPRACH symbol group time-frequency format and an uplink-downlink switching period, a time interval between two continuous transmission units; determining, according to the time interval and the time-domain transmission position of the first transmission unit in the NPRACH transmission group, a time-domain transmission position of the second transmission unit or the subsequent transmission unit(s); and transmitting the second transmission unit or the subsequent transmission unit(s) on the corresponding continuous TDD uplink time-domain section.

Preferably, the step of transmitting, on the determined time-domain resource used for transmitting NPRACH, an NPRACH transmission group in the time-domain format comprises: determining the repetition times N for transmissions of the NPRACH transmission group, and repeatedly transmitting, on the determined time-domain resource used for transmitting NPRACH, the NPRACH transmission group with the time-domain format for N times.

Preferably, the step of determining a time-domain format for the NPRACH transmission group comprises: determining the time-domain format for the NPRACH transmission group according to at least one of the following parameters: TDD uplink time-domain resource, an uplink subframe configuration, a special subframe configuration, an NPRACH format configuration and frequency-band deployment mode.

For this purpose, the present disclosure further provides a method for predicting a random access timing advance, comprising steps of, receiving a narrowband physical random access channel (NPRACH) transmission group, wherein one NPRACH transmission group comprises a number of transmission units which are discontinuous in time domain, one transmission unit comprises one or more NPRACH symbol groups which are continuous in time domain, and phases between two adjacent transmission units are continuous or the phases are fixed, determining a phase deviation according to a time-frequency interval and/or frequency-domain interval between a number of pairs of adjacent transmission units in the NPRACH transmission group, and/or determining a phase deviation according to a frequency-domain interval between different symbol groups in the transmission unit(s), and determining a timing advance (TA) according to the phase deviation, and transmitting the TA to indicate a UE to adjust a time-domain position for transmitting an NPRACH transmission unit.

For this purpose, the present disclosure further provides a user equipment for requesting random access, comprising, an uplink resource determining module configured to determine a time division duplex (TDD) uplink time-domain resource, a transmission resource determining module configured to determine, according to the TDD uplink time-domain resource, a time-domain resource used for transmitting a narrowband physical random access channel (NPRACH), a transmission format determining module configured to determine a time-domain format for an NPRACH transmission group, the time-domain format comprising the following: one NPRACH transmission group comprises at least two transmission units which are discontinuous in time domain, and one transmission unit comprises one or more NPRACH symbol groups which are continuous in time domain, and an NPRACH transmission module configured to transmit, on the determined time-domain resource used for transmitting NPRACH, an NPRACH transmission group in the time-domain format Compared with the prior art, the present disclosure has various technical effects, including but not limited to the following technical effects: by designing a time-domain format for NPRACH transmission according to the characteristics of TDD uplink time-domain resource, a random access process can be applied to an NB-IoT communication system based on TDD, so that the existing NB-IoT system based on FDD can be applicable to the operation mode of TDD. Accordingly, a higher utilization rate of spectrum resources is achieved, and the system throughput and connection efficiency of the NB-IoT system in a scenario where a large number of UEs are to be connected are significantly improved.

Advantageous Effects of Invention

Various embodiments of the present disclosure provide a uplink control information transmission scheme and a random access scheme that are more effective.

BEST MODE FOR CARRYING OUT THE INVENTION

Figure 1:
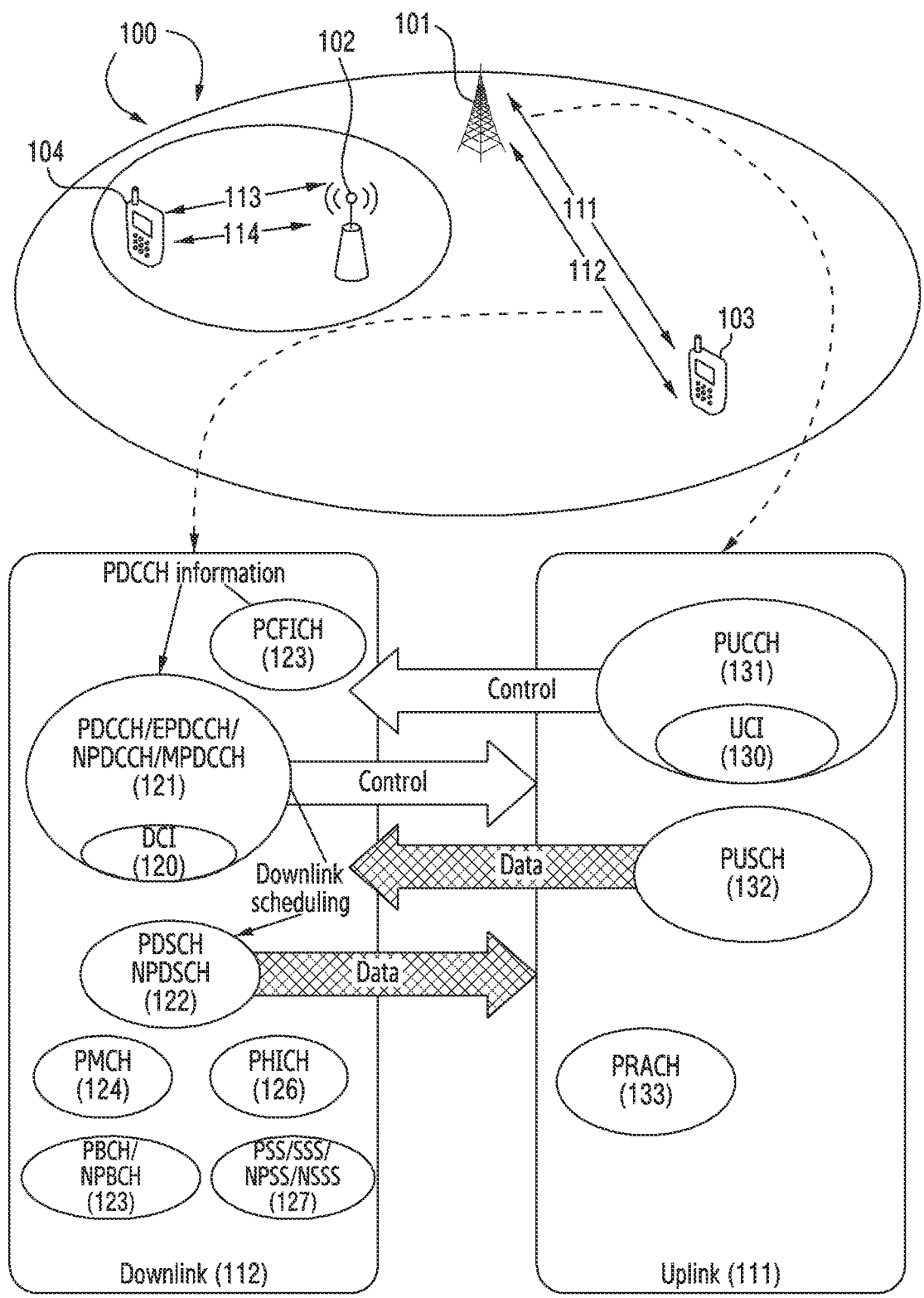
FIG. 1 is a schematic diagram of a radio communication system.

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It should be understood by a person of ordinary skill in the art that singular forms "a", "an", "the", and "said" can be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise radio connection or coupling. As used herein, the term "and/or" comprises all or any of one or more associated listed items or combinations thereof.

It should be understood by a person of ordinary skill in the art that, unless otherwise defined, all terms (including technical and scientific terms) used herein have the same meaning as commonly understood by a person of ordinary skill in the art to which the present disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skill in the art that the term "terminal" and "terminal equipment" as used herein compasses not only devices with a radio signal receiver having no emission capability but also devices with receiving and emitting hardware capable of carrying out bidirectional communication over a bidirectional communication link. Such devices can comprise cellular or other communication devices with a single-line display or multi-line display or without a multi-line display; personal communication systems (PCSs) with combined functionalities of speech, data processing, facsimile and/or data communication; personal digital assistants (PDAs), which may include RF receivers, pagers, internet networks/intranet accesses, web browsers, notepads, calendars and/or global positioning system (GPS) receivers; and/or conventional laptop and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein can be a communication terminal, an internet terminal, a music/video player terminal. For example, it can be a PDA, a mobile internet device (MID) and/or a mobile phone with a music/video playback function, or can be equipment such as a smart TV and a set-top box.

In a long term evolution (LTE) system, uplink control information (UCI) is transmitted on the two ends of the system bandwidth. In this way, the LTE system not only can obtain a frequency hopping (FH) gain to provide decoding performance, but also can efficiently avoid fragmentation of uplink resources, so as to provide resources that can be continuously allocated for a physical uplink shared channel (PUSCH). In an enhanced machine type communication (eMTC) system, the LTE system bandwidth is divided into several narrow bands, in which each narrow band consists of 6 physical resource blocks (PRBs) used for PUSCH transmission. In the LTE system bandwidth, a physical uplink control channel (PUCCH) that carries UCI indicates a PRB position using a radio resource control (RRC) indicator, and further determines the frequency-domain resource position of the UCI according to the position of an MTC physical downlink control channel (MPDCCH) and the indicator in the DCI. 3rd generation partnership project (3GPP) Rel-13 defines a narrowband Internet of things (NB-IoT) system the bandwidth of which is only 200 kHZ, i.e., one PRB, and UCI of it is transmitted using the narrowband physical uplink shared channel (NPUSCH) format 2, and the time-frequency physical resources of the NPUSCH format 2 is indicated by DCI, and the candidate time-frequency positions of it are predefined in the standard.

In 3GPP Rel-15, an NB-IoT system that works in a time division duplex (TDD) frequency band will be standardized, and since the number of uplink slots is limited, if the NPUSCH format 2 and the rule of the FDD NB-IoT continue to be used, then uplink resource granularity will be seriously destroyed, thus seriously affecting the actual uplink data rate of the system. Therefore, it is yet a problem to be solved regarding how to effectively transmit UCI, especially for a narrowband system that works in the TDD frequency band, e.g., a TDD NB-IoT system.

In addition, since the NB-IoT system bandwidth is only 200 kHz, uplink subframes on the anchor carrier will be used by a downlink common channel (e.g., narrowband primary synchronization signal (NPSS), narrowband secondary synchronization signal (NSSS), and narrowband physical broadcast channel (NPBCH)), which will cause uplink and downlink proportions are not even. Therefore, a more flexible multi-carrier operation mode needs to be defined in the TDD NB-IoT system to balance the utilization of the uplink and downlink resources.

For a TDD NB-IoT system that operates in inband or a guardband of the LTE system, to keep the orthogonality with the LTE system and strictly align with PRB resources in the LTE system, there should be a certain offset between the uplink and downlink center frequencies of the TDD NB-IoT system. In addition, since the radio frequency precision of a base station in the NB-IoT system cannot be achieved by a UE in the NB-IoT system, to meet the requirement of LTE outband leakage, for the guardband operation mode, the NB-IoT UE cannot perform uplink transmission over some carrier frequencies in some guardbands. That is to say, there is no uplink carrier corresponding to the downlink carriers of some TDD NB-IoT systems, and therefore, the base station needs to additionally configure an uplink carrier corresponding to these downlink carriers.

The present disclosure accordingly provides a solution to solve the above problems of carrier configuration.

In addition, in 3GPP Rel-13, for a standard NB-IoT system, the frequency-band distribution can be an LTE in-band deployment, an LTE guard-band deployment or a stand-alone deployment. In Rel-14, positioning, broadcast, multi-carrier or other enhancement technologies are incorporated into the 3GPP. At present, FDD systems have been incorporated into standard NB-IoT systems, and the NB-IoT terminals are HD-FDD terminals. To better serve different applications in the internet of things (IoT) and to meet different requirements, the normalization of an NB-IoT system in the TDD frequency spectrum will be developed in 3GPP Rel-15.

A random access process is an important way to establish a connection between a network side and a terminal side in a mobile communication system, and the performance of the random access directly influences the working efficiency of the system. In an NB-IoT system based on FDD, in the frequency domain, an NPRACH (random access channel) is in a form of a single-carrier having a subcarrier spacing of 3.75 kHz; while in the time domain, the NPRACH is a symbol group consisting of one cyclic prefix (CP) and five symbols, wherein every four symbols form one NPRACH transmission. However, since the symbol length corresponding to 3.75 kHz is 266.67 us and a TDD system has a frame structure totally different from an FDD system, the NPRACH transmission needs to be kept consistent with the uplink-downlink configuration of the TDD LTE when the NB-IoT system based on FDD is deployed within an LTE band or an LTE guard band. Therefore, existing NPRACH for FDD are not applicable to TDD systems in terms of format, size, transmission position or more.

In view of this, it is necessary to provide a method and user equipment for requesting random access which can solve the problems described above.

FIG. 1 illustrates an exemplary radio communication system 100 according to embodiments of the present disclosure, in which, a UE detects indication information. The radio communication system 100 includes one or more fixed infrastructure units to form a network distributed in a geographical area. The infrastructure unit may be called as access point (AP), access terminal (AT), base station (BS), node B (Node-B), evolved NodeB (eNB), next generation NodeB (gNB), or other terminologies used in the technical field. As shown in FIG. 1, one or more infrastructure units 101 and 102 provide services for several mobile stations (MSs), or user equipments (UEs), or terminal devices, or users 103 and 104 in the serving area which for example is a cell or a cell sector. In some systems, one or more BSs may be communicatively coupled to a controller that forms an access network, and the controller may be communicatively coupled to one or more core networks. The present disclosure does not limit the radio communication system to a specific type.

In the time domain and/or the frequency domain, the infrastructure units 101 and 102 respectively transmit downlink (DL) communication signals 112 and 113 to the UEs 103 and 104. The UEs 103 and 104 respectively communicate with the one or more infrastructure units 101 and 102 through uplink (UL) communication signals 111 and 114. In an embodiment, the mobile communication system 100 is an orthogonal frequency division multiplexing (OFDM)/orthogonal frequency division multiple access (OFDMA) system that includes multiple base stations and multiple UEs. The multiple base stations include the base station 101 and the base station 102, and the multiple UEs include the UE 103 and the UE 104. The base station 101 communicates with the UE 103 through the uplink communication signal 111 and the downlink communication signal 112. When the base station has downlink packets to be transmitted to UEs, each UE will obtain one downlink position (resource), e.g., a set of radio resources in the physical downlink shared channel (PDSCH) or narrowband downlink shared channel (NPDSCH). When a UE needs to transmit packets to the base station through an uplink, the UE obtains a grant from the base station, in which the grant allocates a physical uplink shared channel (PUSCH) or a narrowband physical uplink shared channel (NPUSH) containing a set of uplink radio resources. The UE obtains downlink or uplink scheduling information from PDCCH, or MPDCCH, or EPDCCH, or NPDCCH specific to the UE. In the following description, these channels are unified as PDSCH, PDCCH, and PUSCH. The downlink or uplink scheduling information and other control information carried in the downlink control channel is referred to as downlink control information (DCI). FIG. 1 also shows different physical channels of the downlink 112 and the uplink 111. The downlink 112 includes a PDCCH or EPDCCH or NPDCCH or MPDCCH 121, a PDSCH or NPDSCH 122, a physical control formation indicator channel (PCFICH) 123, a physical multicast channel (PMCH) 124, a physical broadcast channel (PBCH) or NPBCH 125, a physical hybrid automatic repeat request indicator channel (PHICH) 126 and a primary synchronization signal (PSS), secondary synchronization signal (SSS), or NPSS/NSSS 127. The downlink control channel 121 sends a downlink control signal to the UE. The DCI 120 is carried on the downlink control channel 121. The PDSCH 122 transmits data information to the UE. The PCFICH 123 is used to transmit PDCCH decoding information, e.g., dynamically indicating the number of symbols used by the PDCCH 121. The PMCH 124 carries broadcast and multi-cast information. The PBCH or NPBCH 125 carries a master information block (MIB), used for UE early detection and cell-wide coverage. The PHICH carries hybrid automatic repeat request (HARQ) information, and the HARQ information indicates whether the base station correctly receives a transmitted signal. The uplink 111 includes a physical uplink control channel (PUCCH) 131 that carries uplink control information (UCI) 130, a PUSCH 132 that carries uplink data information, and a physical random access channel (PRACH) 133 that carries random access information. In the NB-IoT system, there is no definition for NPUCCH, and the NPUSCH format 2 is used to transmit the UCI 130.

In an embodiment, the radio communication network 100 uses an OFDMA or multi-carrier architecture, including adaptive modulation and coding (AMC) on the downlink and a next generation single-carrier FDMA architecture or a multi-carrier OFDMA structure used for uplink transmission. The FDMA-based single-carrier structure includes interleaved FDMA (IFDMA), localized FDMA (LFDMA), IFDMA, or DFT-spread OFDM (DFT-S-OFDM) of the IFDMA. In addition, the FDMA-based single-carrier architecture also includes various enhanced non-orthogonal multi-access architectures (NOMA) of the OFDMA system, e.g., PDMA (Pattern division multiple access) (PDMA), SCMA (Sparse code multiple access (SCMA), MUSA (Multi-user shared access (MUSA), LCRS FDS (Low code rate spreading Frequency domain spreading (LCRS FDS), NCMA (Non-orthogonal coded multiple access (NCMA), RSMA (Resource spreading multiple access (RSMA), IGMA (Interleave-grid multiple access (IGMA), Low density spreading with signature vector extension (LDS-SVE), Low code rate and signature based shared access (LSSA), Non-orthogonal coded access (NOCA), Interleave division multiple access (IDMA), Repetition division multiple access (RDMA), Group orthogonal coded access (GOCA), Welch-bound equality based spread MA (WSMA), and so on.

In an OFDMA system, usually downlink or uplink radio resources that contain a set of subcarriers on one or more OFDM symbols are allocated to serve the remote elements. An exemplary OFDMA protocol includes evolved LTE and IEEE 1003.16 standards developed from the 3GPP UMTS standard. The architecture may also include transmission techniques, e.g., multi-carrier CDMA (MC-CDMA), multi-carrier direct sequence CDMA (MC-DS-CDMA), and orthogonal frequency and code division multiplexing (OFCDM) for one divisional or two divisional transmission. Or, the OFDMA system may be based on a simpler time-division and/or frequency-division multiplexing/multiple access techniques, or combinations of these techniques. In an alternative embodiment, the communication system may use other cellular communication protocols, including but not limited to TDMA or direct sequence CDMA.

In an FDD NB-IoT system, UCI is transmitted using the NPUSCH format 2. For an uplink subcarrier gap of 3.75 kHZ, one UCI transmission only occupies one subcarrier and 8 ms; and for an uplink subcarrier gap of 15 kHz, one UCI transmission only occupies one subcarrier and 2 ms. For the NPUSCH format 2, a carrier actually occupied by it is indicated from a predefined table using DCI that schedules a downlink NPDSCH. To leave enough time for a UE with low complexity to decode the NPDSCH, the feedback time of HARQ-ACK of it is at least 12 ms. It is difficult for a traditional downlink NPDSCH feedback mechanism used for the FDD NB-IoT, to transmit uplink data at a high rate (e.g., occupying 12 subcarriers).

Figure 2:
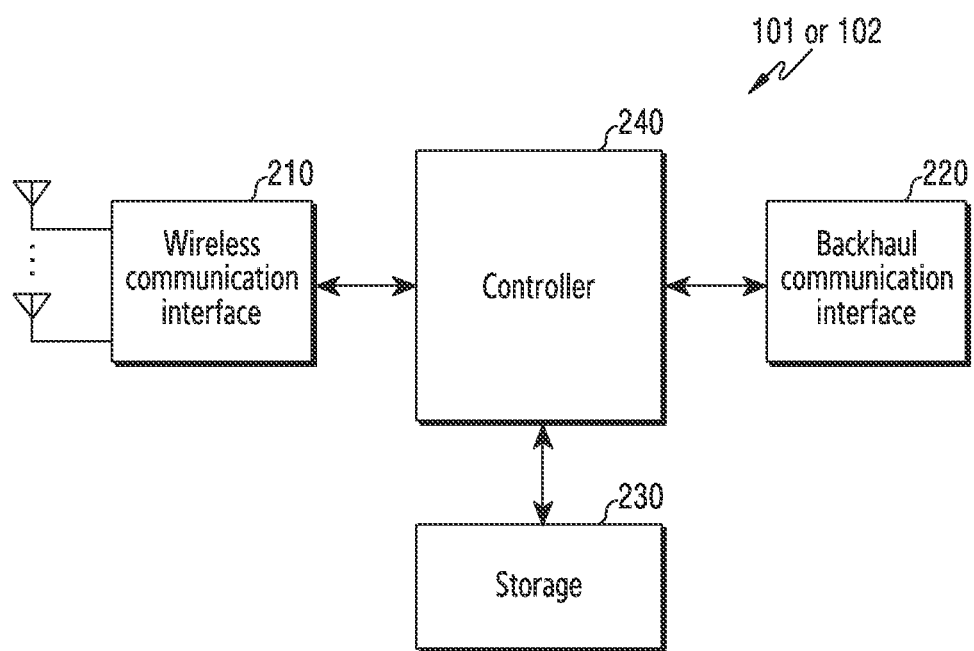
FIG. 2 illustrates a base station in the wireless communication system according to various embodiments of the present disclosure.

FIG. 2 illustrates a base station in the wireless communication system according to various embodiments of the present disclosure. A structure exemplified at FIG. 2 may be understood as a structure of the base station 101 or 102. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into a radio frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "wireless communication unit", a "wireless communication module", a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams. The backhaul communication interface 220 may be referred to as a "backhaul communication unit" or a "backhaul communication module".

The storage unit 230 stores a basic program, an application, and data such as setting information for the operation of the BS. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to exemplary embodiments of the present disclosure, the controller 240 may control the base station to perform operations according to the exemplary embodiments of the present disclosure.

Figure 3:
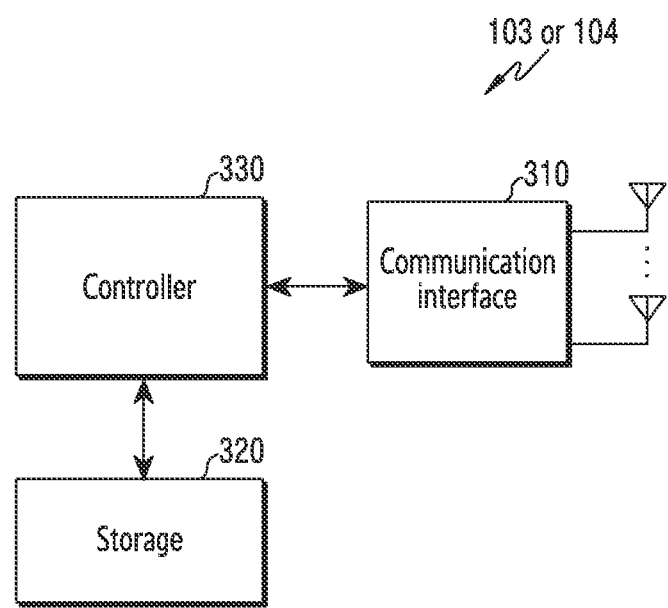
FIG. 3 illustrates a user equipment (UE) in the wireless communication system according to various embodiments of the present disclosure.

FIG. 3 illustrates a UE in the wireless communication system according to various embodiments of the present disclosure. A structure exemplified at FIG. 3 may be understood as a structure of the UE 103 or 104. The term "-module", "-unit" or "-er" used hereinafter may refer to the unit for processing at least one function or operation, and may be implemented in hardware, software, or a combination of hardware and software.

Referring to FIG. 3, the UE includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "communication unit", a "communication module", a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the UE. The storage unit 320 may include a volatile memory, a non-volatile memory, or a combination of volatile memory and non-volatile memory. Further, the storage unit 320 provides stored data in response to a request from the controller 330.

The controller 330 controls the general operation of the UE. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to exemplary embodiments of the present disclosure, the controller 330 ma control the UE to perform operations according to the exemplary embodiments of the present disclosure.

Figure 4:
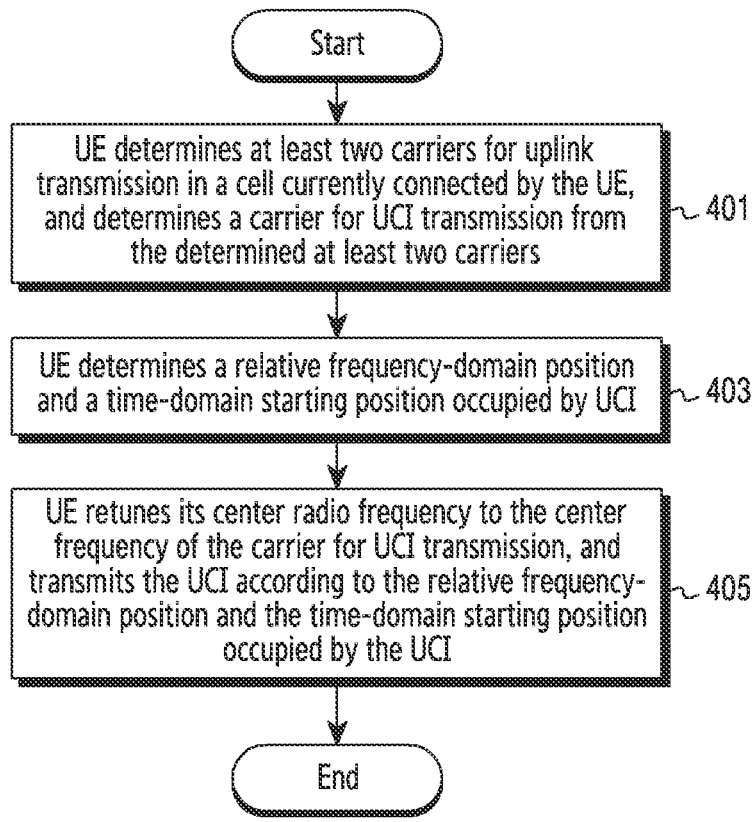
FIG. 4 is a schematic diagram of a basic flow of a method for transmitting uplink control information (UCI) according to the present disclosure.

FIG. 4 is a flowchart of a method for transmitting uplink control information according to the present disclosure.

Referring FIG. 4, in step 401, a UE determines at least two carriers for uplink transmission in a cell currently connected by the UE, and determines a carries for UCI transmission from the at least two carriers determined.

In the method of the present disclosure, the cell connected by the UE includes at least two carriers for the UE to perform uplink transmission. The present disclosure is especially applicable to a narrowband system, and in the narrowband system, the UE only receives and transmits information on one carrier at one time. Preferably, UCI and uplink data of the UE may be transmitted on different carriers, or in other words, a carrier for the UE to transmit UCI and an uplink carrier corresponding to downlink data are different.

In step 403, the UE determines a relative frequency-domain position and a time-domain starting position occupied by UCI on the determined carrier for UCI transmission in step 401.

In step 405, the UE retunes its center radio frequency to a center frequency of the carrier for UCI transmission, and transmits the UCI according to the relative frequency-domain position and the time-domain starting position occupied by the UCI.

For a UE in the NB-IoT system, it only supports UE working on one carrier at one time, and does not support working on two carriers at the same time. Meanwhile, as described in the foregoing, the downlink data channel and the UCI of the UE are transmitted on different carriers, and therefore, before the UE transmits the UCI, the UE needs to retune its center radio frequency to the center point of the carrier for UCI transmission, and then transmits the UCI.

Till then, the overall flow of the UCI transmission method according to the present disclosure ends. In the following, each processing step in the flow of the UCI transmission method will be described in detail.

Firstly, the UCI may be transmitted on an uplink control channel (e.g., a PUCCH) or an uplink shared channel format 2 channel (e.g., an NPUSCH format 2 channel). A carrier where the UCI is located is determined by step 401. The UCI includes at least one piece of the following information: HARQ-ACK information indicating the decoding state of a downlink data channel (i.e., a downlink shared channel), uplink scheduling request (SR) information and periodic and/or aperiodic channel state information (CSI).

For step 401, when determining the at least two carriers for uplink transmission of the UE, the following several detailed approaches may be used:

Approach 1: the UE may determine respective carriers used for uplink transmission of the UE according to signaling (e.g., RRC signaling, including: system information (SIB), UE-specific signaling, etc.) sent from the base station. For example, the UE may obtain the center frequencies of the respective carriers used for uplink transmission according to the signaling, and then determine the corresponding carriers;

Approach 2: the UE may use a carrier where an uplink carrier corresponding to the anchor carrier (a carrier where a downlink synchronization channel is transmitted) or a carrier where a random access channel (e.g., an NPRACH) is transmitted as one carrier used for uplink transmission, and then determines other carriers used for uplink transmission according to signaling sent from the base station, or according to a predefined rule. The predefined rule may be defined as demands. For example it may be defined that several carriers neighboring the uplink carrier corresponding to the anchor carrier or adjacent the carrier where the random access channel is transmitted are the other carriers. For the TDD system, a downlink carrier and a corresponding uplink carrier have a same center frequency, and it is unnecessary to use additional singling to indicate them; that is to say, for the TDD system, a downlink carrier position determined by the UE through cell searching is the uplink carrier position, and a carrier that transmits a synchronization channel is the anchor carrier. For the FDD system, after the UE determines the position of a downlink carrier, the base station configures an uplink carrier corresponding to the downlink carrier through RRC signaling. That is to say, the uplink carrier corresponding to the anchor carrier is indicated by the RRC signaling.

For step 401, when determining the carrier for UCI transmission, the following methods may be used:

Approach a: the UE determines the carrier for UCI transmission according to specified signaling sent from the base station. The specified signaling may be the signaling that indicates the at least two carriers for uplink transmission for the UE in the Approach 1, and that is to say, when the base station configures the at least two carriers for uplink transmission of the UE through the signaling, the base station directly indicates the carrier for UCI transmission in the signaling; or the specified signaling may be the signaling that indicates the other carriers for uplink transmission in the Approach 2, and that is to say, when the base station configures the other carriers for uplink transmission through the signaling, the base station directly indicates the carriers for UCI transmission in the signaling. For example, preferably, the UE determines the carrier for UCI transmission according to RRC signaling, or physical layer information, or MAC layer signaling. Specifically, the base station respectively allocates different carriers for UCI transmission and the uplink data of the UE through the RRC signaling, and in this way, when the UE receives the RRC signaling, it not only can determine the carriers used for uplink transmission, but also can determine the carrier where the UCI is transmitted.

Approach b: after the UE determines the carriers for uplink transmission, it determines the carrier for UCI transmission according to signaling additionally transmitted from the base station. That is to say, the base station configures multiple uplink carriers for the UE according to the Approach 1 or the Approach 2, and then the UE determines which carrier should be used to transmit the UCI from the multiple uplink carriers determined according to the Approach 1 or the Approach 2, according to configuration configured by signaling such as DCI or MAC signaling, or UE-specific RRC retransmitted by the base station.

Approach c: when using the Approach 2 to determine the carriers for uplink transmission of the UE, the carrier for UCI transmission may be determined according to a predefined rule. For example, a rule is predefined as that the UCI is transmitted on another carrier other than the uplink carrier corresponding to a non-anchor carrier, or a carrier where the NPRACH is located, or the UCI is transmitted on an uplink carrier corresponding to the PDCCH or PDSCH, or the UCI is not transmitted on the uplink carrier corresponding to the PDCCH or PDSCH.

Figure 5:
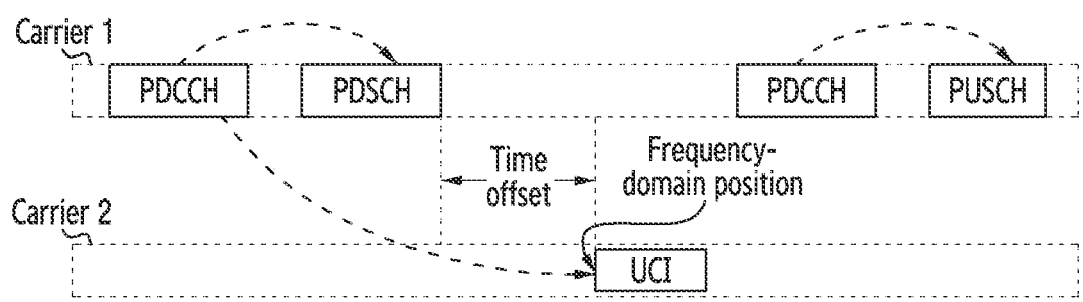
FIG. 5 is a first schematic diagram of UCI transmission in a time division duplex (TDD) system.

FIG. 5 is a schematic diagram of UCI transmission in a TDD system. When determining the carriers, the UE may obtain two carriers, e.g., a carrier 1 and a carrier 2, that can be used for uplink transmission through higher layer signaling (e.g., SIB or UE-specific RRC signaling). Or the UE may perform cell searching, and obtain the position of a downlink anchor carrier, and after the UE determines that the current system is a TDD system, the UE directly determines that the downlink anchor carrier is an uplink carrier (e.g., the carrier 1 in FIG. 3), and then the UE obtains the positions of other carriers (e.g., the carrier 2 in FIG. 3) according to higher layer signaling or according to a predefined rule, and the UCI is transmitted on the other carriers (e.g., the carrier 2 in FIG. 3). Assuming that the downlink control channel PDCCH and the downlink data channel PDSCH that is scheduled by the PDCCH are all transmitted on the carrier 1, then the UCI used for PDSCH feedback is transmitted on the carrier 2. The UE decodes the downlink data channel, and generates the UCI according to a result of decoding the downlink data channel.

In FIG. 3, a relative frequency-domain position and a time-domain starting position for the UCI transmission may be determined using a traditional method. For example, a time offset relative to the end position of the PDSCH and/or a frequency-domain position may be indicated by the DCI. To be specific, a time offset and/or a frequency-domain position set may be configured by RRC or may be predefined, and the DCI indicates one value from the set. Or the smallest time offset is predefined, e.g., 12 ms or 6 ms, and the time-domain starting position of the UCI is a position that starts from the end position of the PDSCH and satisfies the smallest time offset. Further, the PUSCH used for uplink data transmission may also be transmitted on the carrier 1, which is different from the carrier used for UCI transmission. It should be noted that, for the TDD system, if the UCI and the PDSCH/PUSCH are on different carriers, then it should be ensured that when performing retuning, enough time should be reserved for the UE, i.e., reserving time, e.g., 1 ms, for retuning the center frequency in step 405.

In the following, the method for determining the time-domain starting position occupied by the UCI in step 403 will be described in detail. As shown in FIG. 3, the method for determining the time-domain starting position may use a traditional method. However, in the TDD system, as the uplink and downlink subframe configurations are different, the time positions available for uplink transmission are not definite, and therefore, if the traditional method for determining the time-domain starting position is used, a time-domain starting position determined may belong to a downlink transmission time. Therefore, in the TDD system provided by the present disclosure, when determining the time-domain starting position occupied by the UCI, the first valid uplink transmission position that starts from the end position of the downlink data channel and satisfies the specified time offset is determined as the time-domain starting position. The specified time offset may be a preset smallest time offset, or the specified time offset may be a time offset determined according to signaling sent (e.g., through RRC or MAC or DCI) from the base station. In an NB-IoT FDD system, the time offset is an absolute value, e.g., {13, 15, 17, 18}ms. However, in a TDD system, since different uplink and downlink configurations may cause valid uplink subframes to be noncontinuous. To better use the characteristics of the TDD system, and meanwhile to ensure the time for decoding PDSCH, the time offset of UCI may be defined as the xth uplink time unit that satisfies the smallest time offset of 12 ms, e.g., X may be one value out of the set {0,1,2,4}, or may be indicated by downlink DCI. One time unit may be a slot, a subframe, a symbol, the transmission length of one resource unit (RU), or may be an absolute time, e.g., 1 ms. The set may be preset in the protocol, or may be configured through RRC. One valid uplink position may be the time length of one UCI transmission, e.g., one subframe or one slot or two slots. For example, for a subcarrier gap of 15 kHz, the time length of one UCI transmission is 1 ms, and for a subcarrier gap of 3.75 kHz, the time length of one UCI transmission is 4 ms. To be specific, one UCI transmission may consist of 8 symbols that carry UCI data and 7 demodulation reference signals (DMRS) used for UCI detection. For example, the first, second, sixth and seventh symbols in a slot are symbols that carry UCI data, and the third, fourth and fifth symbols are symbols that carry DMRS, or the first, second and third symbols are symbols that carry DMRS and the fourth, fifth, sixth and seventh symbols are symbols that carry UCI data. One UCI transmission spans two slots, and the UE may repeatedly transmit the UCI for several times according to configuration configured by the base station.

In the foregoing method for determining the time-domain starting position of the TDD system, what is different from the traditional method is the first valid uplink transmission position that satisfies the specified time offset. Therefore, in the following, the valid uplink transmission position will be described in detail.

Figure 6:
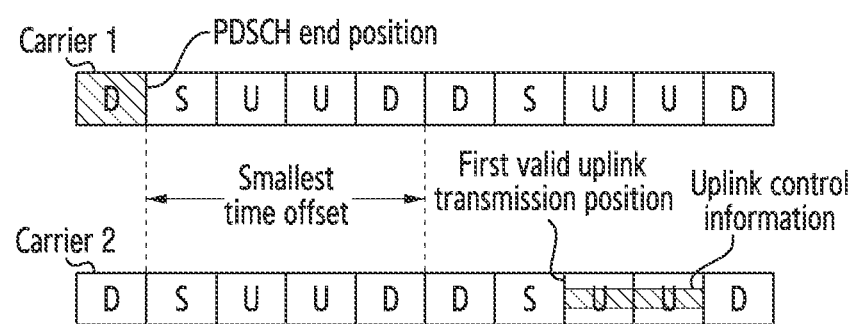
FIG. 6 is a second schematic diagram of UCI transmission in the TDD system.

FIG. 6 is a schematic diagram of UCI transmission in the TDD system, where D represents a downlink subframe determined according to a current TDD uplink and downlink subframe configuration, and the downlink subframe is reserved for downlink transmission; U represents an uplink subframe determined according to the current TDD uplink and downlink subframe configuration, and the uplink subframe is reserved for uplink transmission; S represents a special subframe. As shown in FIG. 4, the valid uplink transmission position is an uplink subframe determined according to the current TDD uplink and downlink subframe configuration. That is to say, the UE determines the time-domain starting position of the resources occupied by the UCI according to the end position of the downlink data channel transmission and the uplink subframe determined according to and the uplink and downlink subframe configuration. To be specific, the UE determines the uplink subframe position according to the uplink and downlink subframe, and starts to transmit UCI in an uplink subframe that meets the specified time offset.

As shown in FIG. 6, assuming that the smallest time offset between PDSCH and UCI is 4 time units, then the first uplink subframe that can be used for UCI transmission and can satisfy the smallest 4 time units is after 6 time units after the PDSCH ends. One time unit may be one slot, one subframe, one symbol, the transmission length of one resource unit (RU), or may be an absolute value, e.g., 1 ms. In another example, DCI indicates 4 uplink time units, and then a time offset between PDSCH and UCI is the smallest time offset plus 4 uplink time units. To be specific, for example, the smallest time offset is 12 ms, and then the uplink subframe for UCI transmission is the fourth uplink time unit after 12 ms after the PDSCH. Since uplink time units may be noncontinuous, then the absolute time may be larger than 12 ms+4 ms (assuming that one uplink time unit is 1 ms).

Figure 7:
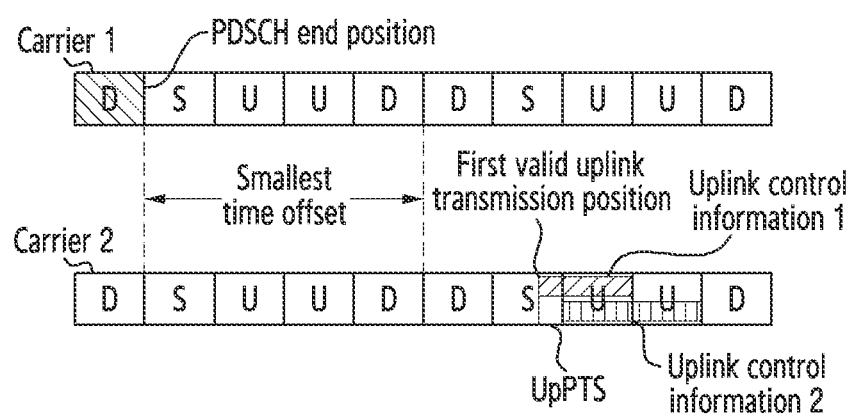
FIG. 7 is a third schematic diagram of UCI transmission in the TDD system.

FIG. 7 is another schematic diagram of UCI transmission in the TDD system, in which an uplink pilot slot (UpPTS) in a special subframe may be used as a valid uplink transmission position, and the valid uplink transmission position may be determined according to the following approaches:

Approach 1, an uplink subframe U determined according to a current uplink and downlink subframe configuration and an UpPTS in a special subframe both can be used as the valid uplink transmission position. To be specific, the UE determines the uplink subframe position according to the uplink and downlink subframe configuration, and starts to transmit UCI in the first uplink subframe that satisfies the smallest time offset or in the UpPTS in the special subframe. For example, the smallest time offset between PDSCH and UCI is 4 time units, and the first uplink subframe or an UpPTS in a special subframe that can be used for UCI transmission after the smallest time units after the PDSCH is an UpPTS after 5 time units after the PDSCH, and in this case, uplink control information 1 is transmitted once (and retransmitted once) in the UpPTS and a following uplink indicator.

In addition, since the number of symbols in the UpPTS is configured according to special subframe configuration information, and in some configurations for the LTE special subframe, there is only one symbol in the UpPTS, used for the sounding reference signal (SRS) transmission, or there are only 2 or 3 symbols. In this case, it is not good for UCI coding, and meanwhile it may cause problems for the base station to semi-statically configure the number of repetitions of UCI. Therefore, in the Approach 2, a threshold may be preset, and when the number of symbols contained in the special subframe is larger than the preset threshold (e.g., there are 5 or 6 symbols in the UpPTS), the UpPTS in the special subframe and uplink subframes can be used as valid uplink transmission positions, and when the number of symbols contained in the special subframe is not larger than the preset threshold, only uplink subframes can be used as valid uplink transmission positions. To be specific, it may be defined that no matter how many symbols in the UpPTS, the UpPTS will not be used for uplink transmission.

Or in Approach 3, whether the UpPTS in the special subframe can be used as the uplink transmission position is determined according to a special subframe configuration currently used. Preferably, it may be preset or may be configured by the base station that UpPTS corresponding to which special subframe configurations can be used as the valid uplink transmission position. For example, in a detailed standard, it may define that, under some special subframe configurations (e.g., the special subframe configurations 5~9), UpPTS can be used as the valid uplink transmission position, and can be used for UCI transmission, and under some other special subframe configurations (e.g., the special subframe configurations 0~4), UpPTS cannot be used as the valid uplink transmission position, and cannot be used for UCI transmission.

Or, in Approach 4, a valid uplink transmission position may be determined based on a preset threshold (or a specific special subframe configuration) in combination with a specific uplink and downlink configuration. To be specific, under the specific uplink and downlink configuration, and under a circumstance where the number of symbols contained in the UpPTS is larger than the preset threshold (or is the specific special subframe configuration), the UpPTS and the uplink subframes all can be used as the uplink transmission positions, or otherwise, only the uplink subframes can be used as the uplink transmission position. For example, only when the number of uplink subframes is not enough, the UpPTS can be used for UCI transmission. For example, in the LTE uplink and downlink configurations 2 and 4, there is only one uplink subframe and one special subframe every 10 ms or 5 ms. In this case, one UCI transmission occupies one UpPTS and one uplink subframe, totally 5 (or 6)+14=19 (or 20) symbols, used for one UCI transmission. To improve the coverage, retransmission may be performed based on this.

Or, in Approach 5, when there are two continuous uplink subframes or an even number of continuous uplink subframes, no matter how many symbols in the UpPTS, only the uplink subframe U can be used as the uplink transmission position to transmit UCI. For example, the uplink control information 2 in FIG. 5 is only transmitted on two continuous uplink subframes, and thus the integrity of UCI transmission can be ensured. For example, in an FDD NB-IoT system, the length of one RU in the PUSCH format 2 having a subcarrier gap of 15 kHz is 2 ms. In this case, if the UCI needs repetition, then it will be transmitted in next two continuous uplink subframes, and the situation where only 1 uplink subframe left will not occur. In this way, it is convenience for the base station to perform scheduling. When there are not two or an even number of continuous uplink subframes, an uplink transmission position may be determined according to the Approach 2 or the Approach 3. Specifically, for a subcarrier gap of 3.75 kHz, the length of one slot is 2 ms, and therefore, for some uplink/downlink configurations, there may be 3 uplink subframes, i.e., 3 ms, and in this case, the UE can only transmit one slot, i.e., 2 ms, and the third slot is idle and will not perform any transmission. The next slot is transmitted next when there is a continuous 2 ms uplink position.

Or, the base station may directly configure whether the UpPTS in the special subframe can be used for UCI transmission. Or the base station may configure a valid uplink transmission position by way of bitmap, and if the special subframe is configured as the valid uplink transmission position, then the UpPTS in the special subframe can be used for UCI transmission, and if the special subframe is configured as the invalid uplink transmission position, then the UCI can only be transmitted in an uplink subframe, and cannot be transmitted in the UpPTS of the special subframe.

The above approaches for indicating the UCI scheduling delay is also applicable to indicate PDSCH and PUSCH. To be specific, the end position of the PDCCH and the starting position of PDSCH or PUSCH which the PDCCH schedules is the first subframe that can be used for uplink or downlink transmission after the scheduling delay indicated by the DCI.

In the following, several methods for determining the relative frequency-domain position occupied by the UCI in step 403 will be described.

Figure 8:
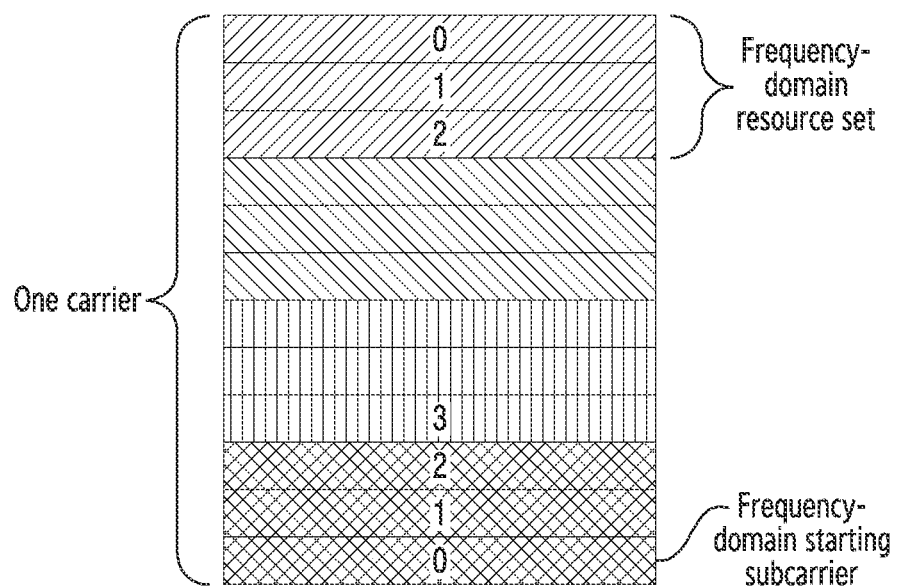
FIG. 8 is a schematic diagram of a method for indicating a frequency-domain position for transmitting UCI.

FIG. 8 is a schematic diagram of a method for indicating a frequency-domain position for transmitting UCI information. After the UE determines the carrier for UCI transmission, the UE may divide several subcarriers in the carrier into several frequency-domain resources sets. As shown in FIG. 8, 12 subcarriers are divided into 4 frequency-domain resource sets, and the base station may configure one of the 4 frequency-domain resource sets for the UE through RRC signaling or MAC signaling. Afterwards, the base station may further dynamically indicate a specific carrier from the set configured through DCI that indicates PDSCH information. For example, in the DCI, using 2 bits indicates position 1 from the 3 positions, and then the UE transmits the UCI on a subcarrier 1 of the carrier for UCI transmission. Similarly, 12 subcarriers may be divided into 3 or 2 frequency-domain resource sets, and there are 4 or 6 subcarriers in each frequency-domain resource set. In another example, the base station may configure the starting position of a subcarrier, and then indicates an offset from its starting position in DCI. For example, 2 bits may be used to indicate 4 offsets of {0, 1, 2, 3}. Different UEs may obtain a starting subcarrier position or a frequency-domain resource set used for UCI transmission according to UE-specific RRC or MAC signaling. From the base station point of view, the base station may configure different frequency-domain positions for UEs having different number of repetitions, and in this way, it is easier for the base station to schedule resources.

Specifically, the time-domain resource position and the frequency-domain resource position may be jointly indicated in DCI.

Figure 9:
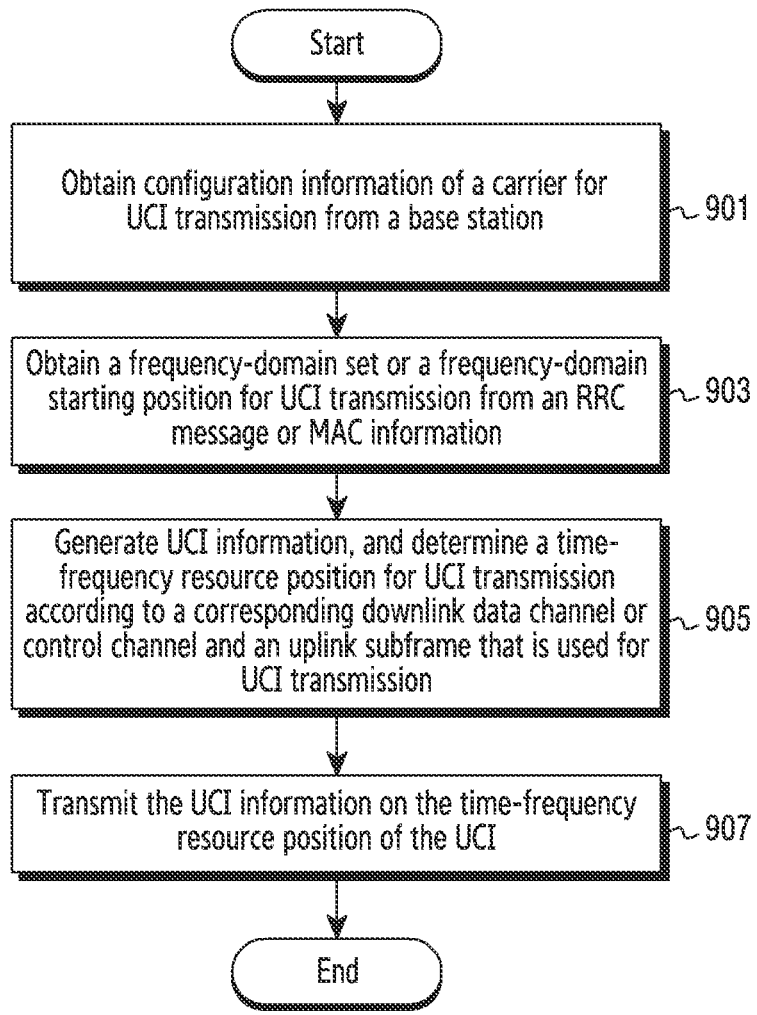
FIG. 9 is a schematic diagram of a detailed flow of a method for transmitting UCI according to an embodiment of the present disclosure.

FIG. 9 is a detailed flowchart of a method for transmitting uplink control information according to an embodiment of the present disclosure.

Referring to FIG. 9, in step 901, a UE obtains configuration information of a carrier for UCI transmission from a base station.

In step 903, the UE obtains a frequency-domain set or a frequency-domain starting position for UCI transmission from an RRC message or MAC information.

In step 905, the UE generates UCI information, and determining a time-frequency resource position for UCI transmission according to a corresponding downlink data channel or control channel and an uplink subframe that is used for UCI transmission.

In step 704, the UE transmits the UCI information on the time-frequency resource position of the UCI.

Specifically, a carrier used for transmitting HARQ-ACK feedback information of MSG4 and/or a frequency-domain resource set in the carrier may be broadcasted in system information (SIB). To be specific, one carrier and/or one frequency-domain resource set in the carrier may be configured for each coverage level. In another example, the HARQ-ACK feedback information of MSG4 is transmitted on a carrier where an NPRACH of a corresponding coverage level is located. In the TDD system, it may be transmitted in an uplink subframe where the carrier for MSG4 transmission is located. The carrier for transmitting the HARQ-ACK information of a downlink data channel after MSG4 and/or the frequency-domain resource set in the carrier may be configured through UE-specific RRC or may be rewritten by MAC signaling. If no carrier for UCI is configured, then in default, the UCI will be transmitted on a corresponding uplink carrier. In other words, transmission on a non-anchor carrier or a UCI-specific carrier may be enabled or disabled through configuration.

What described in the foregoing is a detailed implementation of the method for transmitting UCI according to the present disclosure. The present disclosure further provides a method for receiving UCI, and the receiving method corresponds to the transmitting method.

Figure 10:
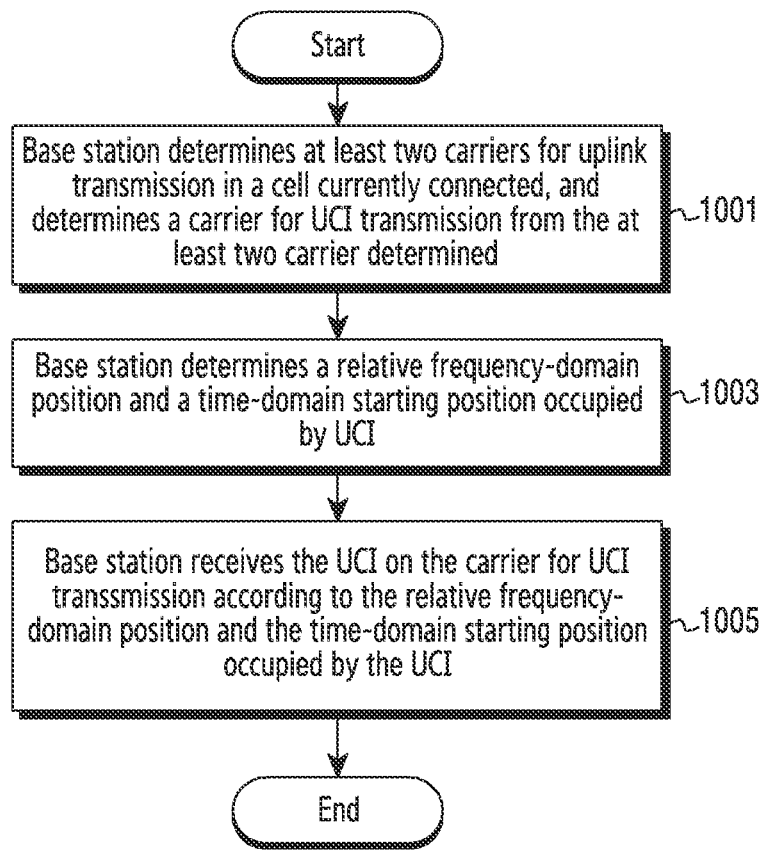
FIG. 10 is a schematic diagram of a basic flow of a method for receiving UCI according to the present disclosure.

Referring to FIG. 10, in step 1001, a base station determines at least two carriers for uplink transmission allocated for a UE in a cell currently connected by the UE, and determines a carrier for UCI transmission of the UE from the at least two carriers for uplink transmission;

In step 1003, the base station determines a relative frequency-domain position and a time-domain starting position occupied by the UCI on the carrier determined for UCI transmission;

In step 1005, the base station receives the UCI, on the carrier for UCI transmission of the UE, according to the relative frequency-domain position and the time-domain starting position occupied by the UCI.

Figure 11:
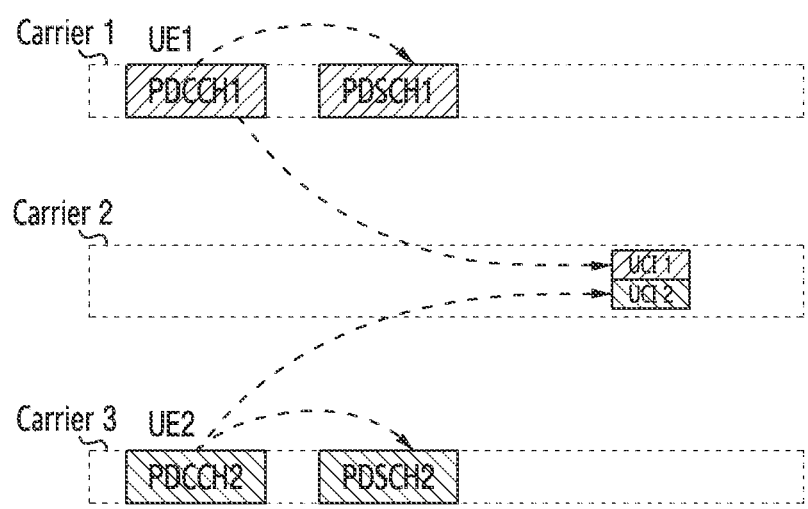
FIG. 11 is a schematic diagram illustrating a base station schedules UCI of multiple UEs.

FIG. 11 is a schematic diagram illustrating a base station schedules the UCI of multiple UEs. As shown in FIG. 11, a carrier for UCI transmission may be configured by a cell-specific parameter or a user-specific parameter. From the base station point of view, the UCI of multiple users may be transmitted on a same carrier. In addition, with the assistance of TDD uplink and downlink subframes, it is very easy to align UCI transmission. To be specific, as shown in FIG. 11, PDSCH 1 and PDCCH 1 of UE1 are transmitted on carrier 1, PDSCH 2 and PDCCH 2 of UE2 are transmitted on carrier 3, and however, the base station configures the UCI of UE1 and UE2 on carrier 2. In addition, it is easy to transmit the UCI of two UEs in a same subframe according to an offset of time scheduling and an offset of frequency scheduling. In this way, the segmentation of resources caused by UCI transmission may be avoided to the maximum extent, so as to improve the spectral efficiency.

Figure 12:
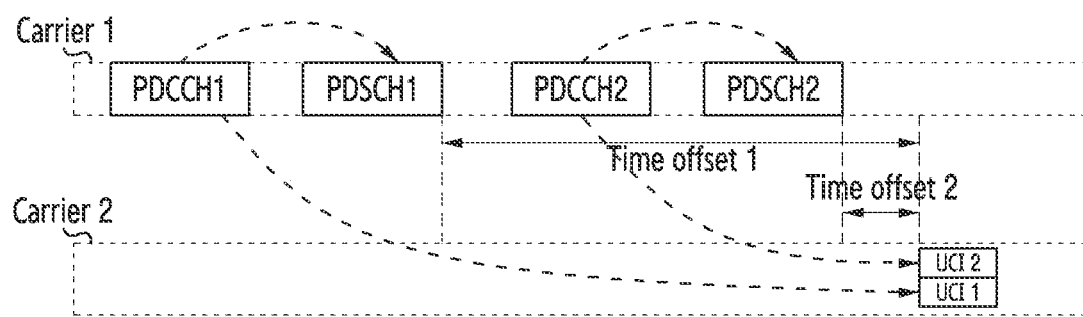
FIG. 12 is a schematic diagram illustrating a base station schedules multiple downlink transmissions for one UE.

FIG. 12 is a schematic diagram illustrating a base station schedules multiple downlink transmissions for a UE. As shown in FIG. 12, the UE supports 2 HARQ procedures, i.e., the UE can transmit the second HARQ procedure even if the first HARQ procedure is not completed. To be specific, PDCCH1 schedules PDSCH1, and indicates UCI time offset 1; PDCCH 2 schedules PDSCH2, and indicates UCI time offset 2. By adjusting the UCI time offset, two UCI can be transmitted in a same subframe. In this situation, they may be transmitted through HARQ bundling, i.e., performing an "or" operation for the two HARQ situations to obtain a bundling result, and then transmitting the bundling result. In another example, as shown in FIG. 12, HARQ procedures may be transmitted on different frequency-domain resources, to reduce PAPR, and two frequency-domain resources for UCI transmission may occupy two adjacent subcarriers. The base station may ensure the transmission by scheduling.

Figure 13:
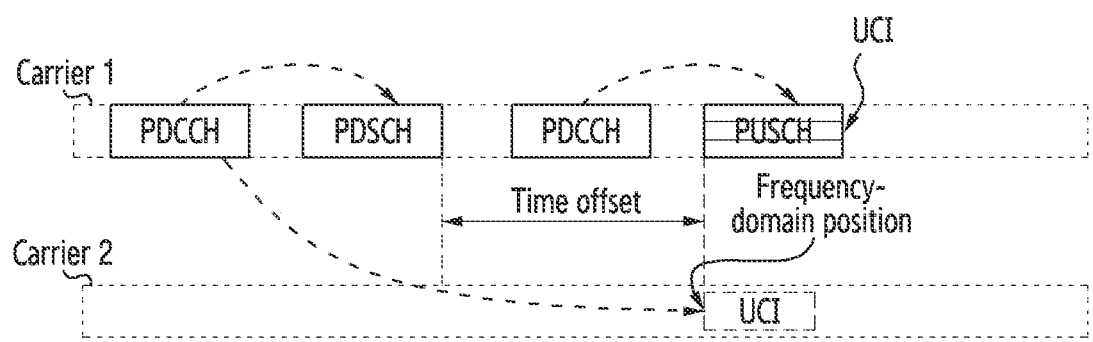
FIG. 13 is a schematic diagram for transmitting UCI in a scenario where there is a collision between UCI and physical uplink shared channel (PUSCH)

In addition, taking a situation where UCI and PUSCH may collide into consideration, the UCI may be transmitted on the PUSCH by means of piggyback. For example, as that in LTE, several symbols close to the DMRS are transmitted. Or the UCI may be transmitted on one subcarrier of the resources where the PUSCH is transmitted. The situation where the UCI and the PUSCH may collide may be a complete collision (including a situation where transmission times of them are equal or one of the transmission times is larger than the other) or a partial collision (a part of them collides). As shown in FIG. 13, when the UCI transmission and the PUSCH collide, the UCI may be transmitted on a subcarrier position indicated by the base station in carrier 1 where the PUSCH is transmitted, and the PUSCH may puncture resources occupied by the UCI (i.e., performing rate matching according to originally scheduled resources, but not performing transmission on the resources occupied by the UCI), or perform rate matching (i.e., deducting the resources occupied by the UCI, and then performing rate matching). For DMRS, it may continue to use PUSCH, or may also perform the puncture. From the UE point of view, DMRS for PUSCH decoding can also be used for UCI decoding. In another example, the MAC control element or the MAC header may be defined as a part of data channel to transmit. In the case of partial collision, the collision part may be processed as above, and the non-collision part will be transmitted as normal, or the UCI or PUSCH of the collision part is dropped, i.e., not transmitted. The above method may be configured by the base station or may be predefined.

Figure 14:
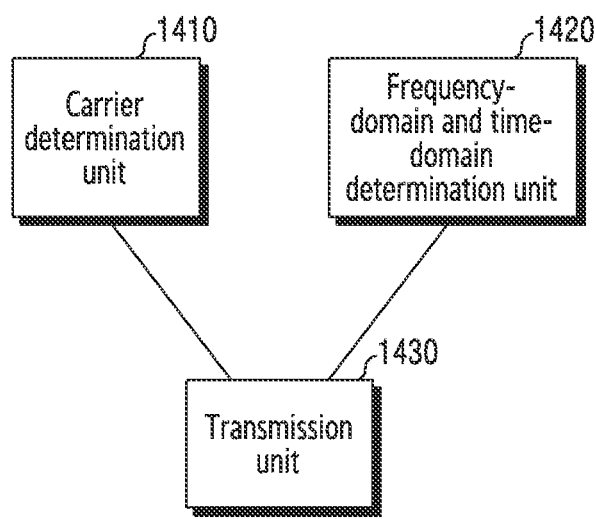
FIG. 14 is a schematic diagram of a basic structure of an apparatus for transmitting UCI according to the present disclosure.

The present disclosure further provides an apparatus for transmitting UCI, and the apparatus can implement the UCI transmitting method in FIG. 14. FIG. 14 is a schematic diagram of a basic structure of the transmitting apparatus. As shown in FIG. 14, the transmitting apparatus includes: a carrier determination unit 1410, a frequency-domain and time-domain determination unit 1020 and a transmission unit 1430.

The carrier determination unit 1410 is configured to determine at least two carriers for uplink transmission in a cell currently connected, and determine a carrier for UCI transmission from the at least two carriers for uplink transmission. The UCI and the uplink data of the UE may be transmitted on different carriers. The frequency-domain and time-domain determination unit 1420 is configured to be used by the UE to determine a relative frequency-domain position and a time-domain starting position occupied by the UCI from the carrier determined for UCI transmission. The transmission unit 1430 is configured to retune a center radio frequency of the UE to a center frequency of the carrier for UCI transmission, and transmit the UCI according to the relative frequency-domain position and the time-domain starting position occupied by the UCI; the transmission unit 1430 transmits information on one carrier at one moment.

Figure 15:
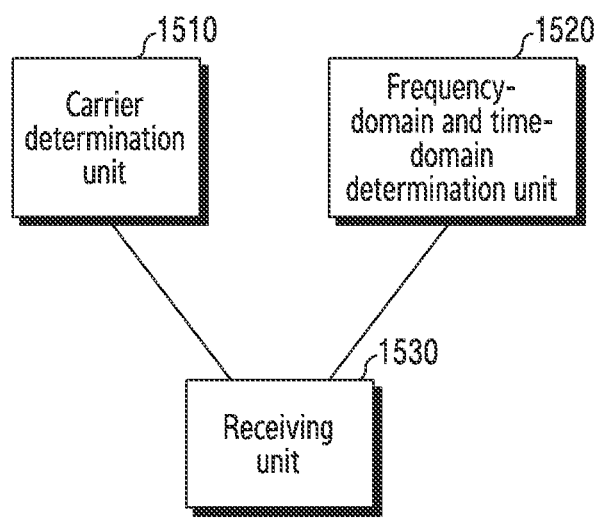
FIG. 15 is a schematic diagram of a basic structure of an apparatus for receiving UCI according to the present disclosure.

The present disclosure further provides an apparatus for receiving UCI, and the apparatus can be used to implement the UCI receiving method described in the foregoing. FIG. 15 is a schematic diagram of a basic structure of the receiving apparatus. As shown in FIG. 15, the receiving apparatus includes: a carrier determination unit 1510, a frequency-domain and time-domain determination unit 1520 and a receiving unit 1530.

The carrier determination unit 1510 is configured to determine at least two carriers for uplink transmission allocated for a UE in a cell currently connected by the UE, and determine a carrier for the UE to transmit UCI from the at least two carriers for uplink transmission. The UCI and uplink data of the UE are transmitted on different carriers. The frequency-domain and time-domain determination unit 1520 is configured to determine the relative frequency-domain and time-domain starting position occupied by the UCI on the carrier determined to transmit the UCI. The receiving unit 1530 is configured to receive the UCI on the carrier used by the UE to transmit the UCI according to the relative frequency-domain position and the time-domain starting position occupied by the UCI; the UE transmits information on one carrier at one time.

The NB-IoT system in the TDD frequency band may have three operation modes. The first one is a separate operation mode independent of a traditional network, i.e., a standalone operation mode; the second one is operating in a guardband of the LTE system, i.e., guardband operation mode; and the third one is operating on any resource block in the LTE carrier, i.e., operating in inband of the LTE system, i.e., inband operation mode. Since a channel raster for the NB-IoT UE to perform cell searching is 100 kHz, and therefore, if the NB-IoT is operating in the guardband of the LTE system, the channel raster of its anchor carrier (a carrier that transmits a synchronization channel) needs to satisfy 100 kHz.

In the NB-IoT system, to enable a UE with low complexity can provide more flexible work in the operation environment, for the LTE inband operation mode and the guardband operation mode, a frequency offset of +/−7.5 kHz or +/−2.5 kHz from the 100 kHz channel raster is allowable. Assuming that the LTE center frequency satisfies the channel raster of 100 kHz, Table 1 lists NB-IoT guardband operation modes corresponding to different LTE system bandwidths. As shown in Table 1, it includes an anchor carrier frequency (from it, an offset between a frequency used as the anchor carrier and the LTE center frequency can be known) in the NB-IoT system, the distance from the LTE carrier, and the number of anchor carriers that can be used as non-anchor carriers in one guardband and the number of valid uplink carriers on each guardband.

To better reduce the LTE outband leakage, it is better to select a frequency/carrier closest to the LTE and meeting the channel raster requirement, and select a frequency/carrier farther from the LTE as a non-anchor carrier. As shown in Table 1, for an LTE system having a bandwidth of 5 MHz, the anchor carrier of it may be configured at Fc+2392.5 or Fc−2392.5 kHz, where Fc is the center frequency of the LTE system, so as to ensure that it is as close to the LTE as much, and meet the channel raster requirement. To be specific, the anchor carrier has a distance of 45 kHz, i.e., 3 subcarriers, from the LTE edge. In this way, interference among the OFDM carriers of the LTE system may be effectively avoided. Similarly, a system bandwidth of 15 MHz also needs to reserve a frequency width of 3 subcarriers to deploy the anchor carrier. For LTE systems of 10 MHz and 20 MHz, the first PRB outside of the system bandwidth can meet the channel raster requirement, and therefore, the first PRB outside of the system bandwidth can be used as the anchor carrier. Besides of the frequencies in Table 1 that satisfy the anchor carrier channel raster requirement, there are a lot of others. However, since the spectrums of the frequencies in Table 1 are mostly used, the non-anchor carriers that can be deployed of them are the most.

In addition, Table 1 lists the numbers of valid uplink carriers on LTE system guardbands corresponding to different LTE system bandwidths. Compared to the number of downlink carriers that can be used for operating, since the outband leakage of the UE cannot achieve an accuracy as that at the base station, to satisfy the outband leakage requirement of LTE system so as to avoid interference with other systems, the most outside carrier counted from the LTE center frequency cannot be used to perform uplink transmission for the UE. Therefore, if the most outside carrier is used, then an uplink carrier at a different frequency needs to be configured to pair it.

TABLE 1

| LTE system Bandwidth | 5 MHz | 10 MHz | 15 MHz | 20 MHz |
|---|---|---|---|---|
| Anchor carrier frequency [kHz] | Fc + 2392.5/ Fc − 2392.5 | Fc + 4597.5/ Fc − 4597.5 | Fc + 6892.5/ Fc − 6892.5 | Fc + 9097.5/ Fc − 9097.5 |
| Distance from LTE carrier | 45 kHz | 0 kHz | 45 kHz | 0 kHz |
| Number of downlink carriers in each guardband | 1 (anchor carrier) | 2 (1 anchor carrier + 1 non-anchor carrier) | 3 (1 anchor carrier + 2 non-anchor carriers) | 5 (1 anchor carrier + 4 non-anchor carriers) |
| Number of valid uplink carriers in each guardband | 0 | 1 | 2 | 4 |

In fact, not only for the TDD NB-IoT system, but also for other TDD narrow band systems, when they are deployed, a narrowband system may operate on the guardband of a wideband system (i.e., the guardband operation mode) or a narrowband system may operate within the system bandwidth of a wideband system (i.e., the inband operation mode). The present disclosure provides a method for transmitting signals, used to determine the center frequency of a downlink carrier or an uplink carrier in the guardband operation mode or the inband operation mode of the TDD narrowband system, so as to accurately transmit the signals.

Figure 16:
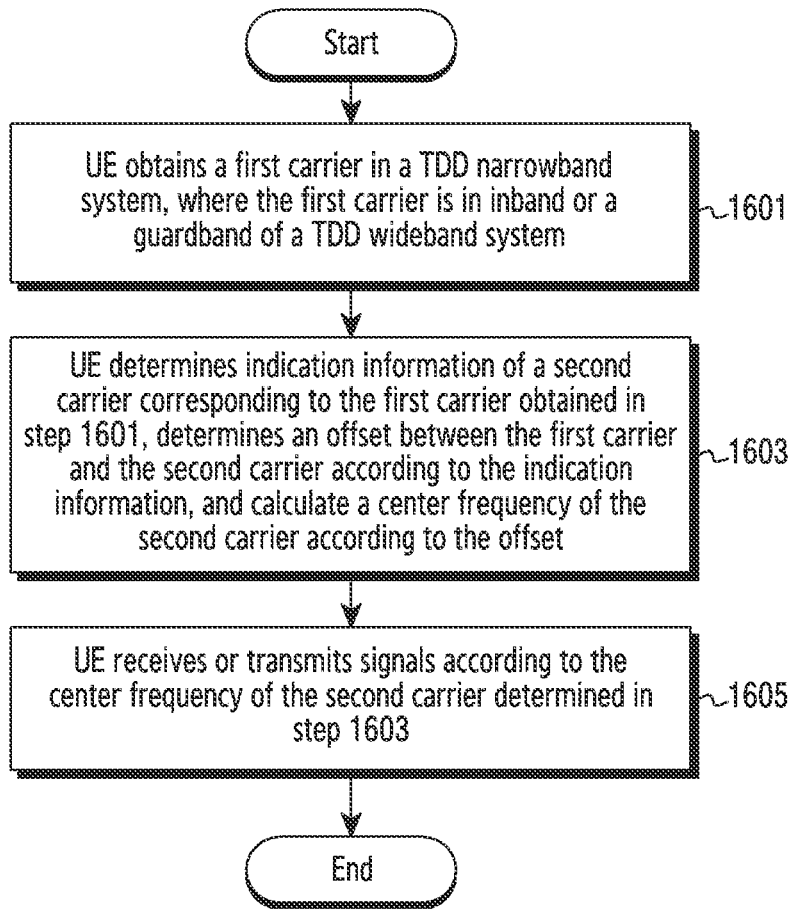
FIG. 16 is a basic flowchart of signal transmission in the TDD system guardband operation mode or the inband operation mode according to the present disclosure.

FIG. 16 is a basic flowchart of a method for transmitting signals in the guardband operation mode or the inband operation mode of the TDD system.

Referring to FIG. 16, in step 1601, a UE obtains a first carrier in the TDD narrowband system, where the first carrier is in a guardband or inband of a TDD wideband system.

The first carrier may be an uplink carrier or a downlink carrier. When the first carrier is an uplink carrier, the second carrier is a downlink carrier corresponding to the uplink carrier; and when the first carrier is a downlink carrier, the second carrier is an uplink carrier corresponding to the downlink carrier.

In step 1603, the UE determines indication information of a second carrier corresponding to the first carrier obtained in step 1601, determines an offset between the first carrier and the second carrier in the TDD narrowband system according to the indication information, and calculate a center frequency of the second carrier corresponding to the first carrier obtained in step 1601 according to the offset.

Determining the indication information of the second carrier corresponding to the first carrier obtained in step 1601 means to, when the first carrier obtained in step 1601 is an uplink carrier, determine the indication information of a downlink carrier corresponding to the uplink carrier obtained in step 1601; and when the first carrier obtained in step 1601 is a downlink carrier, determine the indication information of an uplink carrier corresponding to the downlink carrier obtained in step 1601. Similarly, calculating the center frequency of the second carrier corresponding to the first carrier obtained in step 1601 according to the offset means to, when the first carrier obtained in step 1601 is an uplink carrier, determine the center frequency of a downlink carrier corresponding to the uplink carrier obtained in step 1601; and when the first carrier obtained in step 1601 is a downlink carrier, determine the center frequency of an uplink carrier corresponding to the downlink carrier obtained in step 1601. The offset between the first carrier and the second carrier is an offset between the uplink carrier/downlink carrier and the downlink carrier/uplink carrier.

In step 1605, the UE receives or transmits signals according to the center frequency of the second carrier determined in step 1603.

When the first carrier in step 1601 is a downlink carrier, the downlink carrier may be an anchor carrier or a non-anchor carrier.

In the following, the situation where what is obtained in step 1601 is a downlink carrier will be described.

When the downlink carrier in step 1601 is an anchor carrier, for a UE that initially connects to/camps on the cell, the UE first performs cell searching in step 1601 to obtain the center frequency of a downlink anchor carrier A; then in step 1603, the UE obtains the indication information of an uplink carrier corresponding to the downlink anchor carrier A, and finally determines the center frequency of an uplink carrier B corresponding to the downlink anchor carrier. Or, when the downlink carrier in step 1601 is a non-anchor carrier, same procedures may apply, which will not be elaborated herein.

To be specific, the UE may obtain the indication information through higher layer signaling (e.g., a master information block (MIB) or a system information (SIB) or other RRC messages), and then determine the center frequency of the uplink carrier B corresponding to the downlink carrier A. Preferably, the indication information of the uplink carrier may be one piece of the following information: the absolute value of the center frequency of the uplink carrier, information of a position relative to the TDD wideband system, CRS sequence information. To be specific, the offset from the center frequency of the downlink carrier may be a direction of frequency offset between the uplink and downlink carriers, or may be whether the uplink carrier is in the high frequency or low frequency of the LTE system (left or right); the information of the uplink resources occupied by the uplink carrier B in the TDD wideband system may be the position (an index) of the PRB relative to the LTE system; the position information of the uplink carrier; and the information of relative position in the TDD wideband system may be a relative position to the center frequency of the LTE, or a distance from the edge of the LTE system, or the nth carrier that can operate in the guardband, etc.

Further, a way of determining that the TDD narrowband system is located in the guardband or inband of the TDD wideband system in step 1601 may be that the UE obtains the downlink carrier by performing cell searching, and determines that the downlink carrier is in inband of the wideband system or in the guardband of the wideband system through the following channel(s) or information: synchronization signal, MIB, SIB, UE-specific RRC signaling, physical layer indication information, and MAC layer indication information.

In the following, the detailed processing of step 1603 will be described. As an example, the TDD narrowband system is a TDD NB-IoT system, the TDD wideband system is a TDD LTE system.

In Step 1603, the offset between the uplink frequency and downlink frequency in the TDD NB-IoT system needs to be determined according to the indication information obtained. In the following, first the reason that there is an offset between the uplink and downlink carriers in the TDD NB-IoT system will be described.

Figure 17:
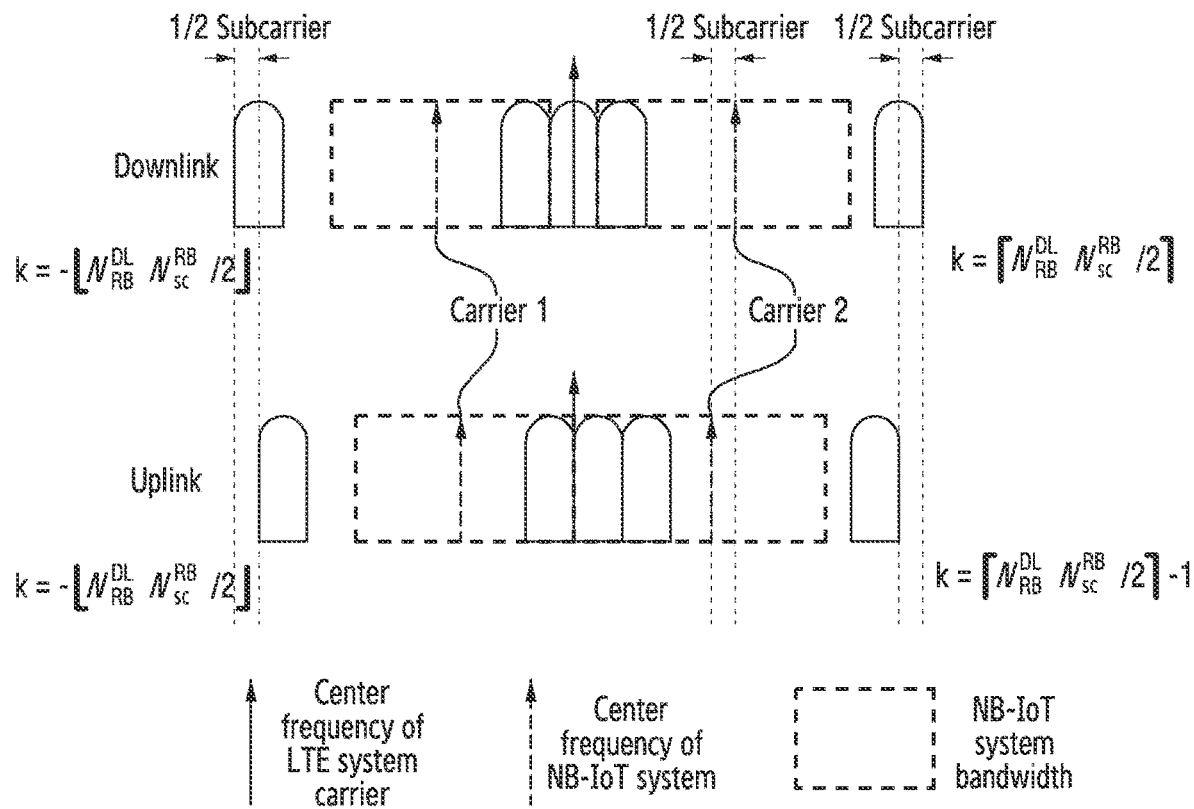
FIG. 17 is a schematic diagram of uplink and downlink carriers in a TDD narrowband system.

In an LTE system, when dividing PRBs, among downlink carriers, a direct subcarrier (DC) does not belong to PRBs, but for the uplink direction, since a DC is on the center subcarrier, then the DC belongs to PRBs. Therefore, in the LTE system, uplink SC-FDMA and downlink OFDMA baseband signal expressions are equivalent to a frequency-domain (phase) offset of 7.5 kHz. As shown in FIG. 17, in the LTE system, subcarriers occupied by downlink start from low frequency $k=-\lfloor N_{RB}^{DL} N_{sc}^{RB}/2 \rfloor$, skip k=0, and continue until $k=\lceil N_{RB}^{DL} N_{sc}^{RB}/2 \rceil$. However, for the uplink direction, the LTE system occupies all subcarriers from $k=-\lfloor N_{RB}^{DL} N_{sc}^{RB}/2 \rfloor$ to $k=\lceil N_{RB}^{DL} N_{sc}^{RB}/2 \rceil-1$, where NR is the number of downlink PRBs, $N_{RB}^{UL}$ is the number of uplink PRBs, $N_{sc}^{RB}$ is the number of subcarriers in one PRB, k is an index of frequency-domain in the OFDM or SC-FDMA system (for detailed information please refer to TS 36.211). For an NB-IoT system having the inband operation mode and the guardband operation mode, only a part of the bandwidth (e.g., a bandwidth of one PRB) of the LTE system is occupied, and to prevent from the interference with the LTE system, the NB-IoT system needs to occupy downlink and uplink frequency-domain resources counted by the unit of PRB. Since uplink and downlink PRBs are divided differently in the LTE system, in the TDD NB-IoT system having the inband operation mode and the guardband operation mode, there will be a frequency offset of a half subcarrier bandwidth between a pair of uplink and downlink center frequencies. For example, as shown by carrier 1 and carrier 2 used in a narrowband system in FIG. 17, there is a frequency offset of +/−7.5 kHz between a frequency actually occupied by uplink and a frequency actually occupied by downlink in the TDD NB-IoT system. For a specific system (e.g., NB-IoT and LTE systems), the absolute value of the uplink and downlink carrier offset is fixed (e.g., for the NB-IoT system deployed in inband or a guardband of LTE system, the absolute value of the uplink and downlink carrier offset is 7.5 kHz), and the UE may calculate it according to system parameters, or the absolute value may be defined in a protocol, and then the signaling configures an offset to the left or to the right (positive or negative sign).

Based on the offset between the center frequencies of a pair of uplink and downlink carriers in the NB-IoT system, for a TDD NB-IoT system that operates in inband or a guardband of the LTE TDD system, to avoid the interference with the uplink and downlink transmission of the LTE system, in the present disclosure, the UE obtains the indication information in step 1603, and uses the indication information to calculate an offset between the center frequencies of the uplink and downlink carriers, so as to accurately calculate the center frequency of the uplink carrier corresponding to the downlink carrier, based on the center frequency of the downlink carrier determined in step 1601, in combination with the offset between the center frequencies of the uplink and downlink carriers. For the inband and guardband operation modes, the base station may carry the indication information through an RRC message (including system information such as MIB, or SIB, or UE-specific message), and the indication information is used to calculate the offset between the uplink and downlink carriers in the NB-IoT system.

Figure 18:
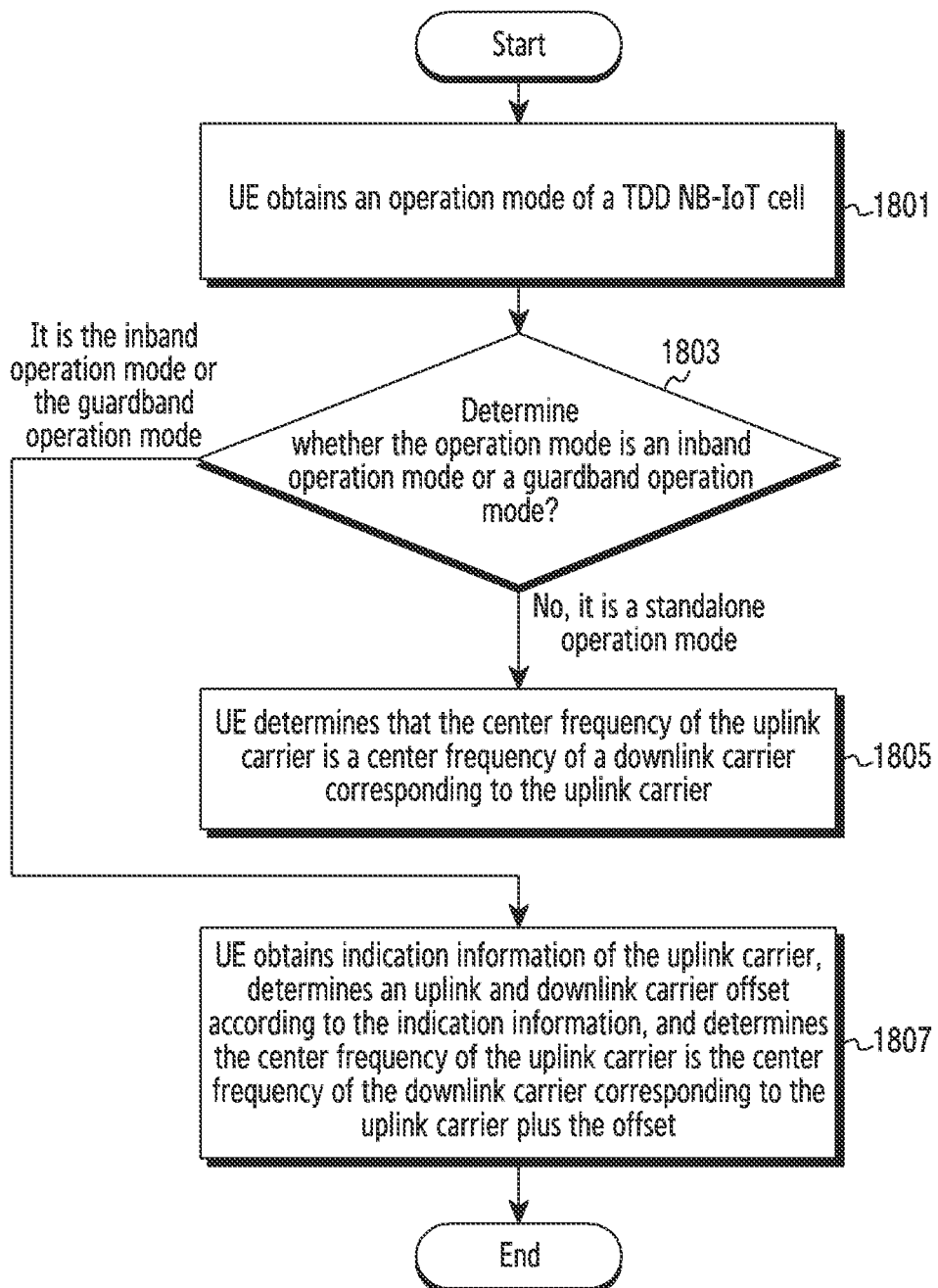
FIG. 18 is an exemplary flowchart of a UE obtaining the center frequency of an uplink carrier.

FIG. 18 is an exemplary flowchart of a UE obtaining the center frequency of an uplink carrier.

Referring to FIG. 18, in step 1801, the UE determines an operation mode of a TDD NB-IoT cell. In step 1803, the UE determines whether the operation mode is an inband operation mode or a guardband operation mode, if the operation mode is neither of them, then performs step 1805; if the operation mode is one of them, then performs step 1807. In step 1805, when the operation mode of the TDD NB-IoT cell is a standalone operation mode, the UE determines the center frequency of the uplink carrier is the center frequency of a downlink carrier corresponding to the uplink carrier.

In step 1807, if the operation mode is the inband operation mode or the guardband operation mode, then the UE obtains indication information of an uplink carrier corresponding to the downlink carrier, determines an offset between the uplink and downlink carriers in the NB-IoT system according to the indication information, and determines that the center frequency of the uplink carrier is the center frequency of the downlink carrier corresponding to the uplink carriers plus the offset.

The processing in step 1807 is equivalent to the processing in step 1603. In step 1807, the offset between uplink and downlink carriers is determined according to an absolute value of the offset between uplink and downlink carriers and an offset direction (i.e., a negative sign or positive sign of the offset). The absolute value of the offset is fixed, and it is equal to the width of a half carrier of the NB-IoT system. Therefore, the uplink carrier indication information is mainly used to determine the offset direction of the frequencies between the uplink and downlink carriers. To be specific, the uplink carrier indication information may be at least one piece of the following information: CRS sequence information, PRB indexes occupied by the uplink carrier, the direction of a frequency offset between uplink and downlink carriers, a relative position to the LTE center frequency, a relative position to the edge of the LTE system, nth carrier that can operate in the guardband, PRB positions (indexes) in the LTE, whether the uplink carrier is located in the high frequency of low frequency (left or right) of the LTE system.

Herein, the offset between uplink and downlink carriers determined according to the indication information may be a positive number, a negative number, or zero. When the offset frequency is zero, it means that the operation mode is the standalone operation mode.

In the above indication information, the frequency offset direction between uplink and downlink carriers is to indicate whether the offset between uplink and downlink carriers is a positive number or a negative number, which is usually indicated using 1 bit. An uplink carrier is located in the high frequency or low frequency (left or right) of the LTE system means that, in the guardband operation mode, the uplink carrier is located in a high frequency or low frequency (left or right) guardband of the LTE system; in the inband operation mode, it means that the uplink carrier is located in a high frequency or low frequency (left or right) part of the LTE system. In fact, the parameter is also a positive sign or a negative sign indicating the offset between uplink and downlink carriers.

Especially, if the higher layer configures that the operation mode is the inband operation mode, and a same cell ID, then the UE may determine a CRS sequence and a channel raster offset according to eutra-CRS-SequenceInfo (CRS sequence information), as shown in Table 2. Table 2 provides LTE/(E-UTRA) PRB indexes $n'_{PRB}$ and channel raster offset corresponding to each CRS sequence information. The LTE/(E-UTRA) PRB index $n'_{PRB}$ is defined as $n'_{PRB}=n_{PRB}-\lfloor N_{RB}^{DL}/2 \rfloor$. In addition, the offset between uplink and downlink center frequencies of the NB-IoT system may be deferred according to $n'_{PRB}$. $n'_{PRB}$ is the position (sequence number) of a PRB relative to the LTE, $n_{PRB}$ is the indexes of PRBs occupied by the uplink carrier, and when $n'_{PRB}$ is a positive integer, the frequency offset of it is −7.5 kHz, and when $n'_{PRB}$ is a negative integer, the frequency offset is +7.5 kHz. In this case, the uplink carrier indication information may only include CRS sequence information, it is not necessary to use additional indication to determine the offset between uplink and downlink carriers. Its detailed implementation may be performed by adding an uplink and downlink offset column to Table 2.

TABLE 2

| eutra-CRS-SequenceInfo | E-UTRA PRB index $n'_{PRB}$ for odd number of $N_{RB}^{DL}$ | Raster offset | eutra-CRS-SequenceInfo | E-UTRA PRB index $n'_{PRB}$ for even number of $N_{RB}^{DL}$ | Raster offset |
|---|---|---|---|---|---|
| 0 | −35 | −7.5 kHz | 14 | −46 | +2.5 kHz |
| 1 | −30 | | 15 | −41 | |
| 2 | −25 | | 16 | −36 | |
| 3 | −20 | | 17 | −31 | |
| 4 | −15 | | 18 | −26 | |
| 5 | −10 | | 19 | −21 | |
| 6 | −5 | | 20 | −16 | |
| 7 | 5 | +7.5 kHz | 21 | −11 | |
| 8 | 10 | | 22 | −6 | |
| 9 | 15 | | 23 | 5 | −2.5 kHz |
| 10 | 20 | | 24 | 10 | |
| 11 | 25 | | 25 | 15 | |
| 12 | 30 | | 26 | 20 | |
| 13 | 35 | | 27 | 25 | |
| | | | 28 | 30 | |
| | | | 29 | 35 | |
| | | | 30 | 40 | |
| | | | 31 | 45 | |

In the case of inband operation mode with different cell IDs, or in the case of guardband operation mode, 1 bit in MIB or SIB (e.g., SIB1, SIB2 or SIB22) is used to indicate an uplink and downlink frequency offset direction, or indicate locating in a high frequency or low frequency part of the LTE center frequency. Or, a relationship between $n'_{PRB}$ and uplink and downlink frequency offset directions may be specified in the protocol, and then an uplink and downlink frequency offset direction is determined according to $n'_{PRB}$ in the uplink carrier indication information, so as to further determine an uplink and downlink carrier frequency offset. Similarly, for the guardband operation mode, MIB or SIM may be used to indicate at least one piece of the following information: PRB index, or an offset between the carrier and the LTE center frequency, or whether an uplink carrier is located in the LTE high frequency or low frequency, or nth carrier that can operate in the guardband, and a distance from the LTE edge (e.g., the parameters in Table 1). In addition, the foregoing multiple information may be jointly coded to use one index to indicate multiple information (e.g., LTE system bandwidth, uplink and downlink offset direction, located on the high frequency or the low frequency).

In addition, as shown in Table 1, for the guardband operation mode, since there are no uplink carriers to pair some carriers that can be used for downlink transmission, the base station may configure an uplink carrier for the UE to pair the carriers. The base station may configure the uplink carrier pairing the downlink carriers for the UE through one or more pieces of the following information: PRB index, PRB index offset, and absolute frequency offset. The configuration may be configured for the UE through RRC (including system information) or MAC or physical layer indication or a combination of RRC and physical layer (PDCCH)/MAC layer. In addition, a specific uplink carrier may be defined for a downlink carrier that does not have a paired uplink carrier through predefining, e.g., for example, defining that the specific uplink carrier is an uplink carrier corresponding to a neighboring downlink carrier. When the base station configures carrier information corresponding to an unpaired downlink carrier, for the non-standalone operation mode, the base station may need to additionally configure an uplink and downlink frequency offset of the TDD narrowband system for the UE, which may be carried out using the foregoing method, and will not be elaborated herein.

Step 1603 is carried out through the foregoing processing, and determines the center frequency of the uplink carrier corresponding to the downlink carrier. In the following, channel signals are transmitted on the determined uplink carrier.

What is described in the foregoing is detailed processing when what is obtained in step 1601 is a downlink carrier. When it is an uplink carrier that is obtained in step 1601, for example, the UE obtains an uplink carrier that is used to transmit random access channel (PRACH) through higher layer signaling (e.g., SIB 22), then indication information of a downlink carrier corresponding to the uplink carrier obtained in step 1601 needs to be obtained in step 1603, and an uplink and downlink carrier offset in the narrowband system is determined according to the indication information, and then the center frequency of the downlink carrier is calculated according to the offset. To be specific, the content of the downlink carrier indication information is similar to that of the indication information of the uplink carrier mentioned in the foregoing, except that the uplink carrier is replaced with downlink carrier, in which the definition of the CRS sequence information is the same, as CRS is only present in the downlink. Similarly to the case of uplink carrier indication information, the UE first determines an uplink and downlink carrier frequency offset direction according to the uplink carrier indication information, and then determines the offset between uplink and downlink carriers, plus an offset based on the center frequency of the uplink carrier determined in step 1601 to obtain the center frequency of the downlink carrier. In the following, the UE receives channel signals on the determined uplink carrier.

What is described in the foregoing is a detailed implementation of the method for transmitting signals in the TDD narrowband system according to the present disclosure. The present disclosure further provides a UE in the TDD narrowband system, and the user equipment can be used to implement the foregoing signal transmitting method. To be specific, the user equipment includes an obtaining unit, a calculation unit, and a transmission unit.

The obtaining unit is configured to obtain an uplink or a downlink carrier of the TDD narrowband system. The calculating unit is configured to, if the uplink or the downlink carrier obtained by the obtaining unit is determined to locate in inband or a guardband of a TDD wideband system, determine indication information of a downlink carrier or an uplink carrier corresponding to the uplink or the downlink carrier obtained by the obtaining unit, and determine an offset between the uplink/downlink carrier and the downlink/uplink carrier in the TDD narrowband system according to the indication information, and calculate the center frequency of the downlink or the uplink carrier corresponding to the uplink or the downlink carrier according to the offset and the center frequency of the uplink and downlink carriers. The transmission unit is configured to transmit signals according to the center frequency of the downlink or the uplink carrier calculated by the calculating unit.

In an FDD NB-IoT system, NPRACH is transmitted on a single-subcarrier with 3.75 kHz subcarrier spacing. In each NPRACH, one symbol group consists of one CP and five symbols, and every four symbol groups form one NPRACH transmission. In order to meet different levels of coverage, multiple repetitions can be configured for the NPRACH transmission. Frequency hopping is used between symbol groups, wherein the hopping frequency between the first and second symbol groups and between the third and fourth symbol groups are 3.75 kHz, and the hopping frequency between the second and third symbol groups is 22.5 kHz. In order to reduce the inter-cell interference, pseudorandom frequency hopping of LTE type 2 is used before every two repetitions.

The method and equipment for requesting random access of the present disclosure can be applied to radio communication systems based on TDD, especially to random access scenarios having an LTE TDD frame structure, an LTE TDD uplink-downlink configuration and a special time slot configuration.

Figure 19:
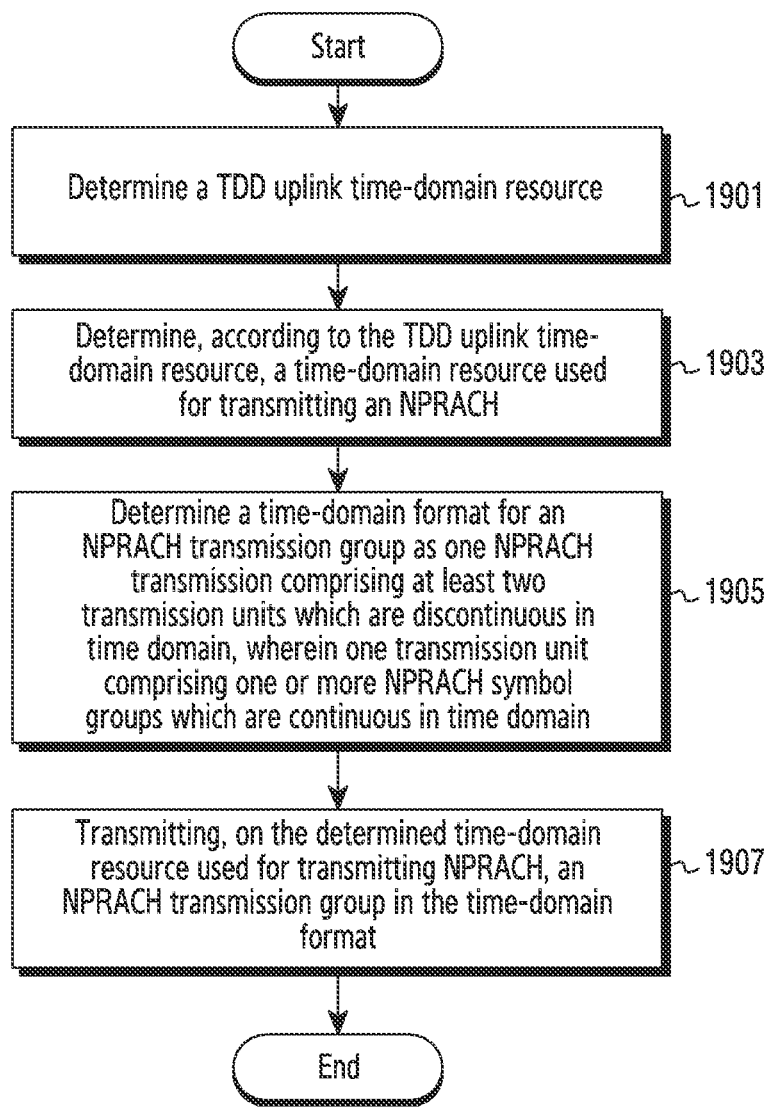
FIG. 19 is a flowchart of a method for requesting random access according to the present disclosure.

FIG. 19 is a flowchart of a method for requesting random access according to the present disclosure.

Figure 20:
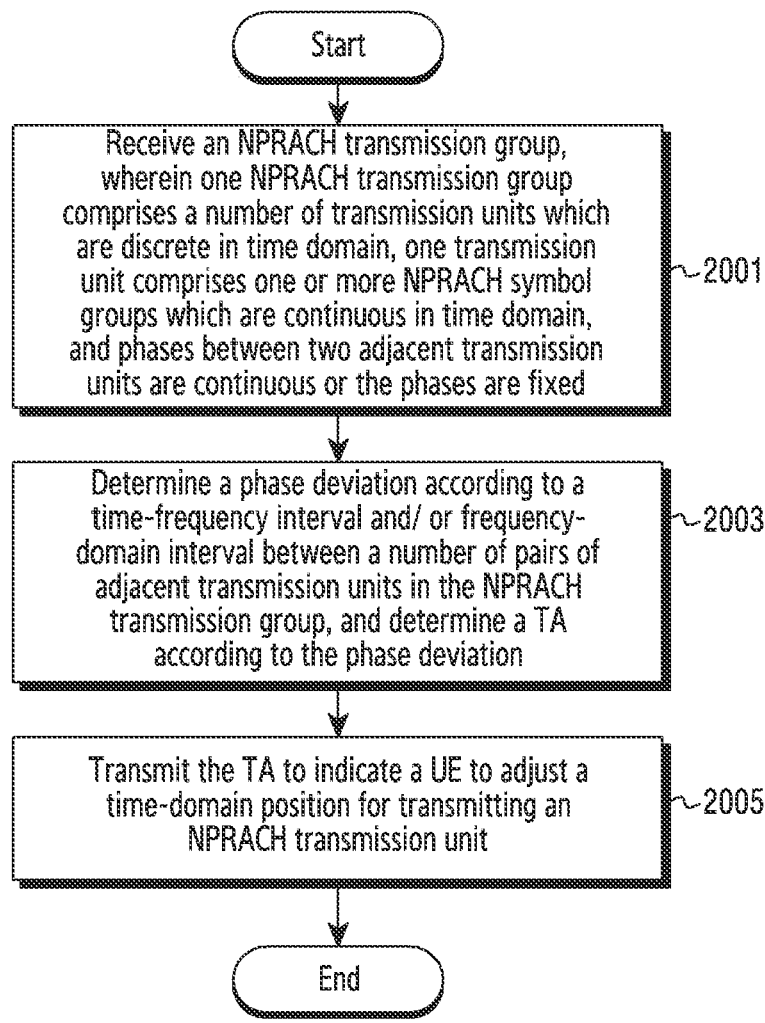
FIG. 20 is a flowchart of a method for predicting a random access timing advance (TA) according to the present disclosure.

Referring to FIG. 19, in step 1901, a TDD uplink time-domain resource is determined. In step 1903, a time-domain resource used for transmitting a narrowband physical random access channel (NPRACH) is determined according to the TDD uplink time-domain resource. In step 1905, a time-domain format for an NPRACH transmission group is determined, the time-domain format comprising, one NPRACH transmission group comprises at least two transmission units which are discontinuous in time domain, and one transmission unit comprises one or more NPRACH symbol groups which are continuous in time domain. In step 1907, an NPRACH transmission group in the time-domain format is transmitted in the determined time-domain resource used for transmitting an NPRACH FIG. 20 is a flowchart of a method for predicting a random access timing advance (TA) according to the present disclosure. Referring to FIG. 20, in order to receive and detect NPRACH, a base station needs to receive and detect an NPRACH transmission group containing discontinuous transmission units. The method comprises the following steps.

Referring to FIG. 20, in step 2001, an NPRACH transmission group is received, wherein one NPRACH transmission group comprises a number of transmission units which are discontinuous in time domain, one transmission unit comprises one or more NPRACH symbol groups which are continuous in time domain, and phases between two adjacent transmission units are continuous or the phases are fixed.

In step 2003, a phase deviation is determined according to a time-frequency interval and/or frequency-domain interval between a number of pairs of adjacent transmission units in the NPRACH transmission group, and a timing advance (TA) is determined according to the phase deviation. In step 2005, the TA is transmitted to indicate a UE to adjust a time-domain position for transmitting an NPRACH transmission unit.

I. Acquisition of TDD Uplink Time-Domain Resource

The uplink time-domain resource can be one or more continuous time-domain sections reserved for uplink transmission within a certain period of time. One continuous time-domain section is a combination of a number of time units without any interval therebetween, and the time units can be subframes, time slots, symbols or more.

If the base station configures valid uplink subframe(s), the configured valid uplink subframe(s) is(are) used as TDD uplink time-domain resource.

If the base station configures valid downlink subframe(s), a subframe other than the configured valid downlink subframe(s) is(are) used as TDD uplink time-domain resource (in this case, no special subframe is configured).

If the base station configures an uplink-downlink configuration, an uplink subframe and an uplink pilot time slot (UpPTS) indicated by the uplink-downlink configuration information are used as TDD uplink time-domain resource. Table 3 shows examples of the uplink-downlink configuration information in LTE. As shown in Table 3, for subframes in each system frame, "D" donates a downlink subframe reserved for downlink transmission, "U" donates an uplink subframe reserved for uplink transmission, and "S" donates a special subframe with three fields: a downlink pilot time slot (DwPTS) reserved for downlink transmission, a guard period (GP) and an uplink pilot time slot (UpPTS) reserved for uplink transmission. The length of the DwPTS and the length of the UpPTS can be additionally configured by a signaling, for example, by a special subframe.

The base station can perform the configuration by a radio resource control (RRC) message, including a system message, a dedicated RRC configuration or more. In another example, the base station configures or rewrites a semi-static RRC configuration by a physical layer (layer 1) signaling, for example, DCI. In another example, the base station configures or rewrites the configuration by an MAC signaling, for example, MAC control elements (CEs), MAC protocol data units (PDUs) or more.

Specifically, the valid uplink or downlink subframe(s) can be configured by a bitmap. For example, 10 or 40 bits indicate 10 or 40 time units (for example, subframes, time slots, symbols or more), respectively. In the method of configuring by a bitmap, a special subframe can be inserted according to a predefined rule, for example, the subframe used for downlink-to-uplink conversion is defined as a special subframe. In the method of configuring by a bitmap, the special subframe can be temporarily considered as the last downlink subframe, or not considered as an uplink or downlink subframe, or can be considered as the first uplink subframe. Or, only when the guard period between the valid uplink subframe and the valid downlink subframe is less than a certain value, a GP is created, for example, by puncturing or skip several uplink or downlink symbols. In another example, uplink subframes can be configured by configuring the ratio between uplink subframe(s) and downlink subframe(s), for example, 1:1, 1:4 or more. The way of configuring uplink subframes by configuring the ratio between uplink subframe(s) and downlink subframe(s) can also be combined with a configured or predefining a period, where the ratio represents the proportion of uplink and downlink subframes within this period. During the calculation of the ratio, the special subframe can be temporarily considered as an uplink or downlink subframe.

For different frequency-band deployment modes, for example, LTE in-band deployment, LTE guard-band deployment and stand-alone deployment, the configuration can be performed by different methods. For example, with regard to the LTE in-band or guard-band deployment, it is more appropriate to directly follow the uplink-downlink configuration for the LTE to avoid the interference to the LTE system. However, with regard to the stand-alone deployment, the configuration can be done by configuring valid uplink or downlink subframes or by configuring the ratio.

In addition, the base station can broadcast a cell-specific uplink-downlink configuration by an SIB broadcast. The base station can also reconfigure a UE-specific uplink-downlink configuration by a dedicated RRC signaling, an Mac signaling or a physical layer channel.

In addition, for a PUSCH or a PUCCH, uplink subframes can be dynamically determined according to the scheduling. For example, a UE transmits an uplink channel in PUSCH or PUCCH on time-frequency resources dynamically indicated by a physical layer. In this case, it is unnecessary to acquire the TDD uplink time-domain resource. That is, on the UE side, there is no need to distinguish a TDD system or an FDD system.

TABLE 3

Uplink-downlink configurations in LTE

| Uplink-downlink configuration | Downlink-to-uplink switching point period | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

II. Format for the NPRACH Symbol Group

The format for the NPRACH symbol group comprises a time-frequency format. A time-domain format and a frequency-domain format in the time-frequency format will be described below.

In an FDD NB-IoT system, a physical layer random access preamble is based on single-subcarrier frequency hopping symbol groups. A random access preamble sequence group consists of four symbol groups, and the four symbol groups are transmitted for $N\_rep\^NPRACH$ times without gaps. One symbol group consists of a cyclic prefix (CP) of length of TCP and 5 identical symbols with total length of TSEQ, wherein the parameters are as shown in Table 4. Ts is a time unit, and satisfies the condition: $30720 \cdot T\_S = 1$ ms. In the FDD NB-IoT system, the NPRACH transmission starts from $N\_start\^NPRACH \cdot 30720T\_s$ time units after the starting position of a system frame satisfying the condition $n\_f \mod(N\_start\^NPRACH/10)$. $N\_start\^NPRACH$ is the starting time of the NPRACH, $N\_period\^NPRACH$ is the period of NPRACH resources, and both $N\_start\^NPRACH$ and $N\_period\^NPRACH$ are configured by the base station through an RRC (SIB).

TABLE 4

Random access preamble parameters for FDD

| Preamble sequence format | $T_{CP}$ | $T_{SEQ}$ |
|---|---|---|
| 0 | $2048T_s$ | $5 \cdot 8192T_s$ |
| 1 | $8192T_s$ | $5 \cdot 8192T_s$ |

Since there are no continuous uplink subframes with a length of several milliseconds in a TDD system, particularly when in the LTE in-band deployment and the LTE guard-band deployment, the design in the FDD NB-IoT system cannot be reused. In order to enable one symbol group of the NPRACH to be transmitted within a time-domain range of one UpPTS plus one uplink subframe, the number of symbols and/or the length of the CP in the NPRACH symbol group is to be reduced. Specific examples refer to Table 5.

TABLE 5

Random access preamble parameters for TDD

| | $T_{CP}$ | $T_{SEQ}$ |
|---|---|---|
| A1 | $4480T_s$ | $3 \cdot 8192T_s$ |
| A2 | $2048T_s$ | $4 \cdot 8192T_s$ |
| A3 | $1480T_s$ | $4 \cdot 8192T_s$ |
| A4 | $2576T_s$ | $4 \cdot 8192T_s$ |
| A5 | $672T_s$ | $5 \cdot 8192T_s$ |
| A6 | $1768T_s$ | $5 \cdot 8192T_s$ |

Table 5 shows examples of random access preamble parameters for TDD.

A1: a symbol group consisting of a CP with a length of 4480 Ts and three symbols at a subcarrier spacing of 3.75 kHz.

A2: a symbol group consisting of a CP with a length of 2048 Ts and four symbols at a subcarrier spacing of 3.75 kHz.

A3: a symbol group consisting of a CP with a length of 1480 Ts and four symbols at a subcarrier spacing of 3.75 kHz.

A4: a symbol group consisting of a CP with a length of 2576TS and four symbols at a subcarrier spacing of 3.75 kHz.

A5: a symbol group consisting of a CP with a length of 2576 Ts and five symbols at a subcarrier spacing of 3.75 kHz.

A6: a symbol group consisting of a CP with a length of 672 Ts and five symbols at a subcarrier spacing of 3.75 kHz.

By comparing Table 4 with Table 5, relative to FDD, one symbol group in the TDD time-domain format comprises one CP and three to five symbols, and the total length of each symbol group is not greater than 43008*Ts (the length of TCP+TSEQ in the preamble sequence format 0 in Table 4). That is, the total length of a single symbol group is reduced.

If other subcarrier spacings are used, the symbol length will change correspondingly. For example, at a subcarrier spacing of 15 kHz, the symbol length is 2048 Ts. If the number of symbols in one symbol group remains unchanged, nearly ¼ Ts is correspondingly reduced. However, in order to support a certain cell coverage radius, the length of the CP should be approximate to but less than 2048 Ts. In other words, with regard to a subcarrier length of 15 kHz, one symbol group comprises one CP and three to six symbols, and the total length of each symbol group is not greater than 14336 Ts (one CP with a length of 2048 Ts and six symbols each with a length of 2048 Ts). The number of symbols can be determined according to the length of the NPRACH transmission units and the number of symbol groups in each transmission unit. If a subcarrier spacing of 15 kHz or more is used, the number of symbol groups in each transmission unit should be more than 2, for example, 2 or 4, so that a sufficient frequency-hopping interval can be provided for each transmission unit to realize accurate TA estimation.

It is to be noted that, in the above examples, a GP (guard period) can be created at the end of a symbol group by further importing a TA. The above examples are applicable to different special subframe configurations. Specifically, for example:

an UpPTS of one symbol plus an uplink subframe: A1, A2, A3 and A4;

an UpPTS of two symbols plus an uplink subframe: A2, A3 and A4;

an UpPTS of three symbols plus an uplink subframe: A2, A3 and A4;

an UpPTS of four symbols plus an uplink subframe: A2, A4 and A5;

an UpPTS of five symbols plus an uplink subframe: A2, A4, A5 and A6; and an UpPTS of six symbols plus an uplink subframe: A6 or the NPRACH format 0 in the FDD NB-IoT.

Notes: In the latter three situations, A1 and A3 can also be selected, but the GP will be far longer than the CP, resulting in waste.

In addition, a subcarrier spacing of 15 kHz can also be designed. Thus, 15 symbols can be contained in an uplink subframe of 1 ms. One symbol can be used as a CP. Or, a half (1024 Ts) of a symbol is used as a CP, and the other half is used as a GP. In a case of a special subframe plus an uplink subframe, like 3.75 kHz, approximately one symbol or a half of a symbol is selected as a CP, and other symbols are used to transmit NPRACH symbols.

In addition, in order to adapt to the transmission in the above format and reserve a GP equivalent to the CP in length, different timing advances need to be imported. That is, the actual transmission time of the NPRACH occupies more uplink symbols or is advanced by more time units than other uplink transmission channels or signals. Or, the actual transmission time of the NPRACH is advanced by more time units than the uplink transmission in the LTE system. For a random access channel, an additional TA will not influence base stations (BS) or terminals in the system. Since the GP in the TDD system design is used to ensure that, in an actual system, a terminal that is located at the cell edge and requires a larger TA will not interfere, when using a larger TA configuration, the reception of downlink subframe(s) by this UE. However, since, in the NB-IoT system, uplink scheduling and downlink scheduling can ensure a GP of 1 ms, the terminal will not be influenced even if an additional TA is provided to the NPRACH. The specific configuration of the TA, the reference time or more will be descried below in detail.

III. NPRACH Transmission

The format for an NPRACH transmission group will be described first. The time-domain format for the NPRACH transmission group can be determined according to at least one of following parameters: the uplink configuration, the special subframe configuration, the NPRACH format configuration, and the deployment mode.

Figure 21:
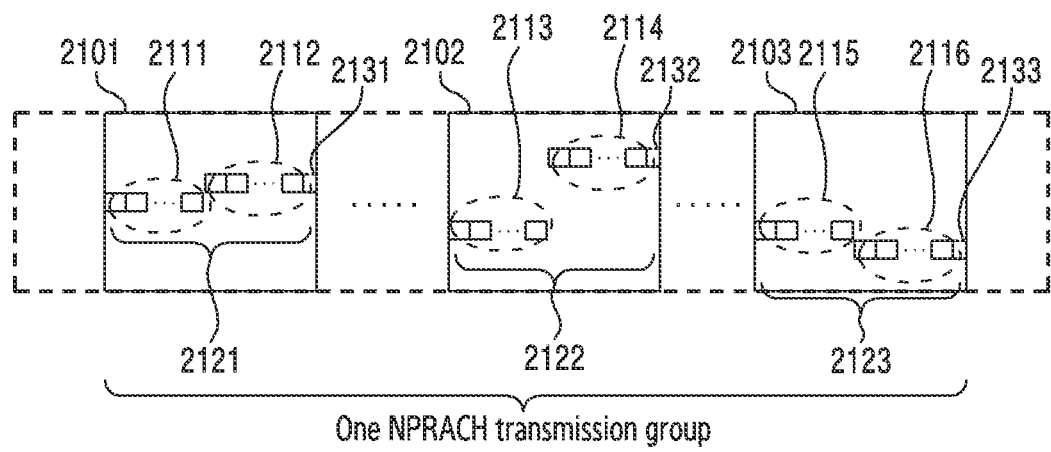
FIG. 21 is a schematic diagram of an narrowband physical random access channel (NPRACH) transmission group according to the present disclosure.

In order to use uplink subframe(s) having a limited continuous length or a combination of uplink subframe(s) and an UpPTS in a TDD system, multiple symbol groups can be divided into a number of transmission units, and these transmission units are transmitted discontinuously in the time domain. That is, a guard time is inserted between two transmission units. One transmission unit comprises one or more symbol groups which are continuous in time domain. A UE transmits an NPRACH in unit of transmission groups, where each transmission group comprises a number of transmission units. That is, the UE transmits one transmission group during each transmission of the NPRACH. FIG. 21 is a schematic diagram of an NPRACH transmission group. As shown in FIG. 21, one NPRACH transmission group comprises a number of transmission units 2121, 2122 and 2123, and the transmission units are transmitted discontinuously in NPRACH uplink resources 2101, 2102 and 2103, respectively. Each transmission unit comprises two symbol groups. For example, the transmission unit 2121 comprises two symbol groups 2111 and 2112; the transmission unit 2122 comprises two symbol groups 2113 and 2114; and the transmission unit 2123 comprises two symbol groups 2115 and 2116. After each transmission unit, a certain time interval is reserved as a guard period (GP), for example, GPs 2131, 2132 and 2133. Preferably, each transmission group comprises two transmission units or three transmission units. The length of one NPRACH symbol group or the number of symbols in the symbol group is directly configured by the UE according to the RRC, or determined according to the special subframe configuration and uplink-downlink configuration of the cell. That is, the UE determines the NPRACH time-frequency format according to at least one of the following information: the received RRC signaling, special subframe configuration information and uplink-downlink configuration information. Between different symbol groups, the frequency hopping is used for timing estimation. As shown in FIG. 21, same or different frequency-hopping intervals can be used between the symbol groups 2111 and 2112, between the symbol groups 2113 and 2114, and between the symbol groups 2115 and 2116. That is, each symbol is transmitted on a different frequency-domain resource. Preferably, the one or more frequency-hopping intervals between symbol groups in a number of transmission units in one NPRACH transmission group are different.

The BS estimates a TA according to a phase deviation between symbol groups transmitted on different frequency-domain resources. By importing different frequency-hopping intervals between NPRACH transmission groups, both the estimation accuracy of the TA and the supported cell radius can be improved. The BS calculates a phase deviation resulted from different time-domain positions occupied by the continuously transmitted symbol groups in each transmission unit, and then estimates the TA based on the phase deviation. Or, the BS also estimates the TA, according to different frequency-domain intervals occupied by symbol groups between different discontinuously transmitted transmission units. In order to estimate the TA by the frequency-hopping interval between the discontinuously transmitted symbol groups, the UE needs to ensure that the phase at the end of the previous symbol group is the same as the phase at the beginning of the next symbol group (the phases are continuous) or that the phase at the end of the previous symbol group and the phase at the beginning of the next symbol group satisfy a fixed phase deviation.

For example, the BS continuously receives a first NPRACH transmission unit, and then receives a second NPRACH transmission unit after a certain time interval X. The BS determines, according to the first NPRACH transmission unit, the second NPRACH transmission unit and the certain time interval X, a TA for the UE to transmit the NPRACH transmission units. Further, the BS determines, according to the frequency-hopping interval(s) between multiple symbol groups in the NPRACH transmission units and the time interval X, a phase deviation between symbols, and then determines a TA according to the phase deviation. Preferably, the phases of the two transmission units are continuous or are fixed values.

Further, in order to increase the NPRACH coverage, the UE can repeatedly transmit the NPRACH transmission group for multiple times. Specifically, the UE can determine the repetition times N for transmissions of the NPRACH transmission group and then repeatedly transmit, on the determined TDD uplink time-domain resource, the NPRACH transmission group with the time-domain format for N times. Preferably, the BS configures one or more NPRACH resources, and each NPRACH resource corresponds to a different repetition times N. Thus, the UE selects, according to the coverage level where the UE is located, a corresponding NPRACH resource to request random access.

Figure 22:
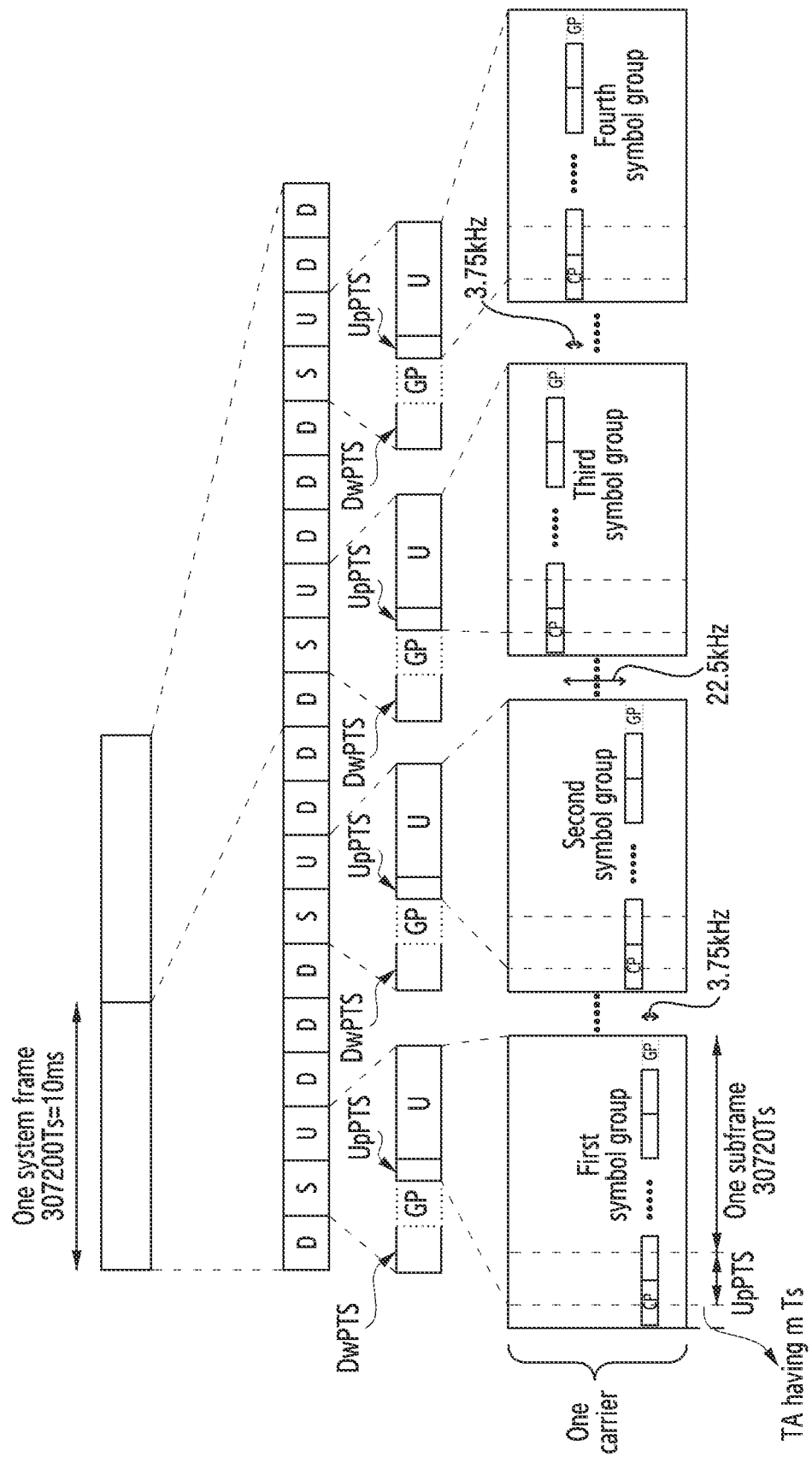
FIG. 22 is a schematic diagram of a first type of NPRACH transmission according to the present disclosure.

Referring to FIG. 22, it is a schematic diagram of one transmission of an NPRACH by a UE, i.e., transmission of one transmission group. For example, within two system frames (20 ms), four transmission units are transmitted for four times. One transmission unit is transmitted in an UpPTS in a special subframe and an uplink subframe following the UpPTS every 5 ms. In the example of FIG. 22, each transmission unit comprises one symbol group, that is, each transmission unit consists of one CP and a number of symbols. For example, each transmission unit consists of one CP and three, four or five symbols. The transmissions of each transmission units are discontinuous. Moreover, since each transmission unit is followed by a downlink subframe or an uplink subframe used for other channels or other UEs' uplink transmission, a GP is needed after each discontinuously transmission unit to avoid the inter-symbol interference. In FIG. 22, one transmission unit comprises one symbol group. That is, the first symbol group, the second symbol group, the third symbol group and the fourth symbol group are not transmitted continuously, and a GP is inserted after each symbol group to avoid interference. The uplink-downlink configuration in FIG. 22 is the uplink-downlink configuration 2 in Table 3, and one transmission of the NPRACH containing four symbol groups will take 20 ms. If the uplink-downlink configuration 5 in Table 3 is used or other uplink-downlink configurations (e.g., configuration 3 or configuration 4) at a switching period of 10 ms are used, one transmission of the NPRACH containing four symbol groups will take 40 ms. For the configuration 3 or configuration 4, or for the configuration 0, configuration 1 or configuration 6 among the uplink-downlink configurations, two symbol groups can be continuously transmitted in two or three continuous uplink subframes, so that the transmission delay is reduced.

Figure 23:
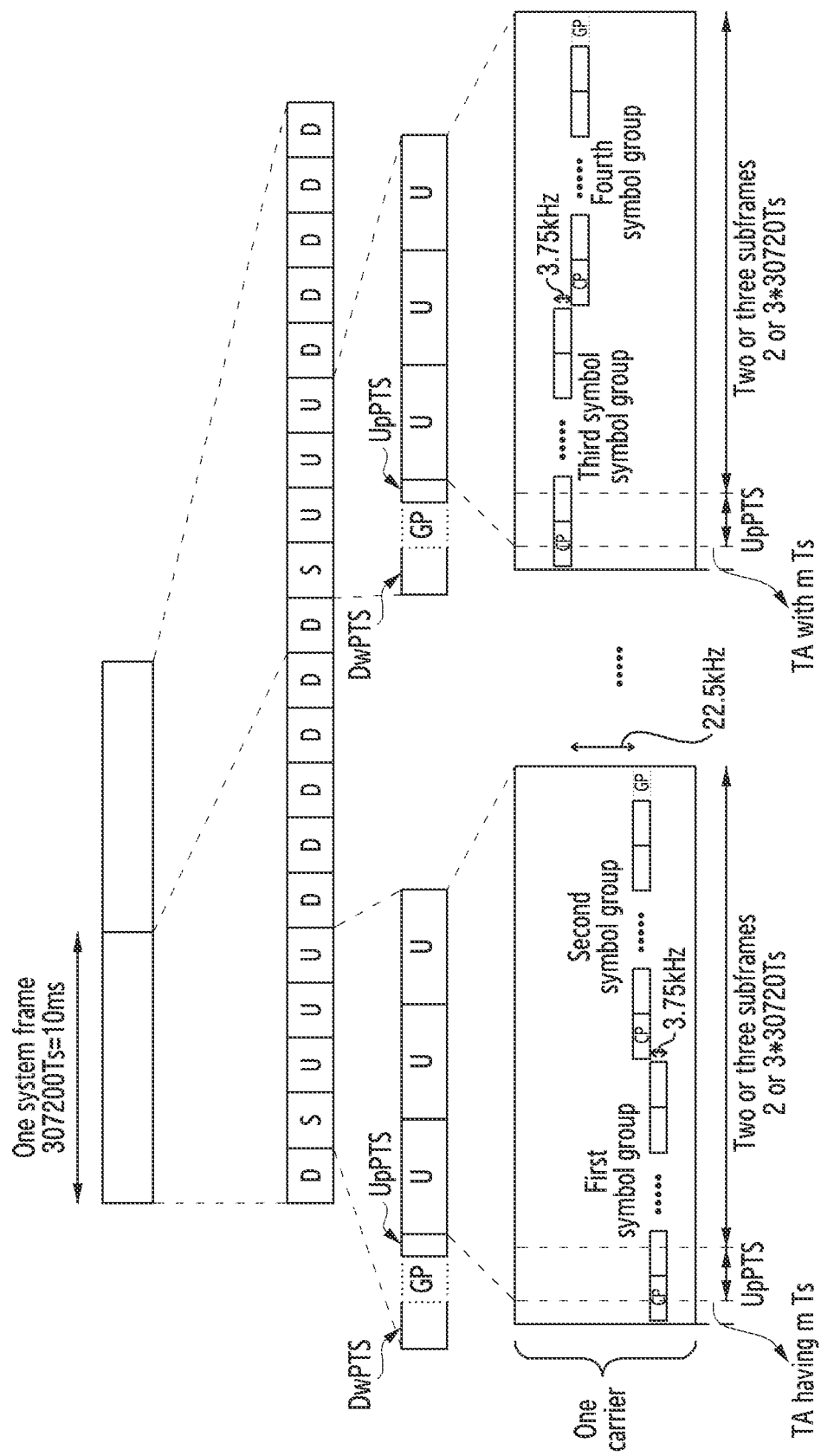
FIG. 23 is a schematic diagram of a second type of NPRACH transmission according to the present disclosure.

Referring to FIG. 23, it is a schematic diagram of one transmission of an NPRACH by a UE, i.e., transmission of one transmission group. In FIG. 23, one transmission unit comprises two NPRACH symbol groups which are transmitted continuously, which occupies one UpPTS in a special subframe and three uplink subframes after the UpPTS; and, a GP is needed after one transmission unit (i.e., two NPRACH symbol groups) to avoid the inter-symbol interference. Specifically, as shown in FIG. 21, a GP is inserted after the second symbol group and the fourth symbol group, respectively. In addition, one or two NPRACH symbol groups can also occupy one UpPTS and two subsequent uplink subframes. The UE can determine the transmission mode of the NPRACH according to the uplink-downlink configuration and the special subframe configuration, for example, the number of the continuously transmitted symbol groups in one transmission unit. During one NPRACH transmission, the number of symbol groups in each transmission unit can be the same or different. For example, in the uplink-downlink configuration 9, one UpPTS and three uplink subframes are continuously transmitted within first 5 ms, and one UpPTS and two uplink subframes are continuously transmitted within latter 5 ms. In this case, the number of the continuously transmitted symbol groups in one transmission unit can be different.

In the embodiments shown in FIG. 22 and FIG. 23, no matter whether the symbol groups are continuous or not, different symbol groups are transmitted with frequency hopping. For example, a first frequency-hopping interval is used between the first and second symbol groups; and similarly, the first frequency-hopping interval is also used between the third and fourth symbol groups. A second frequency-hopping interval is used between the second and third symbol groups. For example, the first frequency-hopping interval can be an NPRACH subcarrier spacing. The first frequency-hopping interval is 3.75 kHz, and the second frequency-hopping interval is 22.5 kHz. The first frequency-hopping interval, the second frequency-hopping interval and other frequency-hopping intervals can be adjusted to other values according to the subcarrier spacing, the cell radius, the multi-carrier configuration or other factors. For example, the second frequency-hopping interval can be greater than the width of one carrier. In addition, four symbol groups in FIG. 22 or FIG. 23 are used as one frequency-hopping pattern unit. When four symbol groups in a next frequency-hopping pattern unit are transmitted, a third frequency-hopping interval is used between the fourth symbol group and the first symbol group in the next unit. The third frequency-hopping interval can also be greater than the width of one carrier. Similarly, for an NPRACH channel at a subcarrier spacing of 15 kHz, frequency hopping can be performed at 3.75 kHz to maintain the estimation accuracy of the TA, or frequency hopping is performed at 15 kHz to maintain the integrity of the system. The second frequency-hopping interval can be frequency hopping at 150 kHz or 120 kHz. Thus, the NPRACH channel can be located at two frequency-domain edges of one carrier (PRB), while the interior of this carrier is reserved for NPUSCH transmission. If the symbols of the NPRACH are at a subcarrier spacing of 15 kHz, the length of the symbols is ¼ of 3.5 kHz, and the total number of symbols in one symbol group in the foregoing embodiments can be increased by 4 times.

Or, in the same continuous uplink resource, there can be two to four symbol groups in one NPRACH transmission unit. Thus, in one transmission unit, two or more frequency-hopping intervals can be provided to accurately estimate the TA and support a larger cell radius.

As shown in FIG. 22 and FIG. 23, the BS calculates, according to the predefined first frequency-hopping interval between the first and second symbol groups and between the third and fourth symbol groups and the predefined second frequency-hopping interval between the second and third symbol groups, a phase deviation resulted from the TA, and estimates the TA according to the phase deviation and the first and second frequency-hopping intervals. The frequency hopping between the first and second symbol groups and the frequency hopping between the third and fourth symbol groups can be inverse, for example, 3.5 kHz and −3.75 kHz. In the TDD system, one NPRACH transmission group consists of discontinuously transmitted transmission units. Therefore, during the calculation of the phase deviation, the time interval X for discontinuous transmissions will be taken into consideration. In addition, when the TA is estimated by the phase deviation resulted from the frequency hopping between discontinuous transmissions, it will be ensured that the phases are continuous or the phase deviation is pre-known.

In addition, in order to meet higher coverage requirements, the NPRACH transmission group can be repeated for multiple times. The BS can configure the starting position of the repetition of the NPRACH transmission group and the repetition times. The third frequency-hopping interval is used between different repetitions of the NPRACH transmission group. In order to adapt to different coverage levels, the NPRACH can be configured with one or more levels, wherein each level corresponds to different repetition times of the transmission group. In different coverage levels, the time-domain format for the NPRACH transmission group can be the same or different. In addition, in order to offload the number of UEs, the NPRACH can be configured in multiple carriers, for example, non-anchor carriers, wherein the non-anchor carriers are carriers in which no synchronization signal is transmitted. Different transmission group formats, different repetition times or more can be configured for NPRACH in different carriers. For example, different non-anchor carriers are deployed in different deployment modes, for example, LTE in-band deployment, LTE guard-band deployment or stand-alone deployment.

In one example, a terminal acquires, according to the uplink subframe configuration, an uplink-downlink switching period to transmit discontinuously transmitted NPRACH resources. For example, regardless of the uplink subframe configuration, i.e., no matter how many uplink subframes, one or more continuously transmitted symbol groups in the NPRACH start from the uplink-downlink switching period.

In one example, the UE determines, according to the distribution of uplink subframes and special subframes, the starting position of the first symbol group of each transmission unit, or determines, according to the number of uplink subframe(s) on a continuous uplink time-domain section for one transmission unit, the starting position of the first symbol group of this transmission unit.

Figure 24:
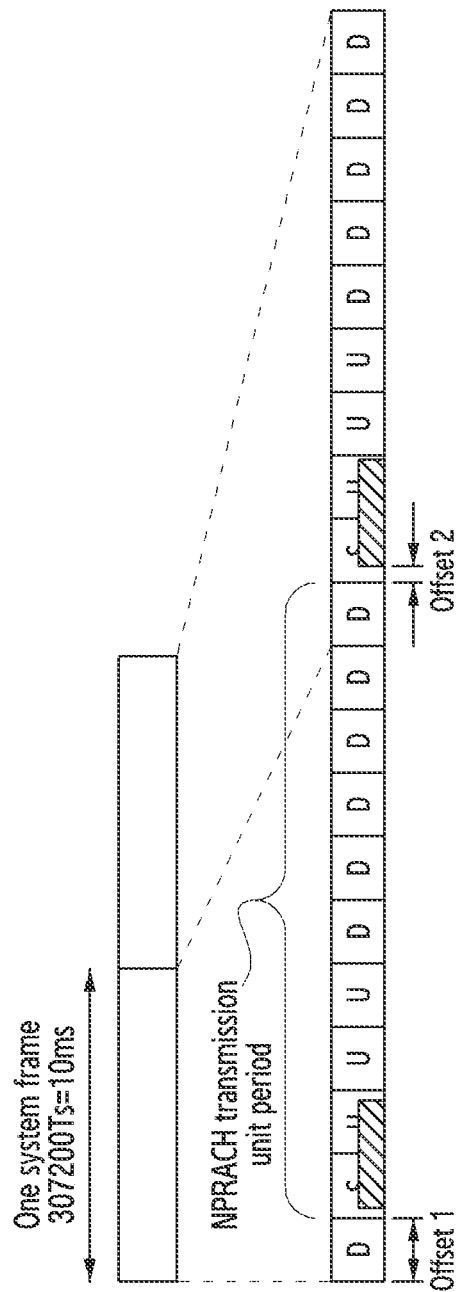
FIG. 24 is a schematic diagram of a third type of NPRACH transmission according to the present disclosure.

Referring to FIG. 24, in the example of FIG. 24, each NPRACH symbol group merely occupies one special subframe and one uplink subframe. Even if there are three continuous uplink subframes transmitted in the uplink subframe configuration, the NPRACH will not continuously occupy the remaining continuous uplink subframe(s). Thus, these subframes can be used for other uplink channels, for example, a transmission of a NPUSCH.

In one example, a terminal determines a time interval (including a starting time interval between first symbol groups of the two continuous transmission units, or a time interval between the end of the last symbol group of the previous transmission unit and the head of the first symbol group of the next transmission unit, or in other ways of determining the time interval between two transmission units) between two continuous transmission units by receiving RRC direct configuration information from a BS. As shown in FIG. 23, the BS can directly configure the period between NPRACH symbol groups as 10 ms through the RCC. In addition, one or more NPRACH formats can be defined, and each format predefines a corresponding time interval value used for determining the time-domain interval between two continuous transmission units, so that the terminal can determine the time-domain interval between two transmission units according to the NPRACH time-frequency format and the predefined corresponding value.

Further, in order to use a same NPRACH format as far as possible in the case of different uplink-downlink subframe configurations or special subframe configurations, the starting position of one or more symbol groups in the NPRACH and the period can be directly configured through the RRC (as shown in FIG. 24, the period of the NPRACH transmission units can be configured). For example, an offset of one or more system frames from a certain reference point is directly configured through the RRC. The reference point can be the starting position of a certain subframe. The offset is used for determining the time-domain starting position of one or more symbol groups (i.e., transmission units) in one NPRACH transmission. As shown in FIG. 24, an offset 1 from the starting position of a subframe 0 or an offset 2 from the starting position of a special subframe (a subframe 1) can be configured. Thus, regardless of the uplink subframe configuration, the presence or absence of the special subframe, and the special subframe configuration, the NPRACH can be configured in a same way. In different deployment modes, a same configuration method can be used. It is easily understood that the reference point can also be an uplink subframe, a downlink subframe, a system frame, or even a symbol in a subframe, or more, and a terminal determines the reference point by TDD uplink time-domain resource. The offset can also be a predetermined fixed value.

The frequency-domain position for NPRACH transmission will be described below. A UE determines a frequency-domain position for transmitting different NPRACH symbol groups (i.e., determines at least one of a carrier position, a subcarrier group and a subcarrier position) according to the received indication of an RRC signaling, a predetermined fixed value or a downlink control signaling, and then determines a range of frequency-domain resources for transmitting different NPRACH symbol groups in a frequency hopping manner. In a contention-based random access process, the UE selects a subcarrier from a subcarrier group for transmission, and transmits several symbol groups in a frequency hopping manner according to a specified frequency-hopping pattern. In a scheduling-based random access process, the UE transmits an NPRACH according to a subcarrier configured by a BS. Preferably, the frequency-hopping pattern can be predefined or determined by a cell ID or determined by a random sequence generated by using a cell ID as a seed. In addition, from the perspective of the BS, configuring different carriers or subcarriers (groups) for a NPRACH for different cells can prevent the long-term occupation of fixed uplink resources by the NPRACH from resulting in access delay or mismatch of uplink-downlink resources. In addition, the frequency hopping for the NPRACH can improve the NPRACH detection performance and avoid the inter-cell interference.

IV. TA for the NPRACH

The coverage range of a cell is limited by a CP and a GP of an NPRACH. Therefore, a GP equivalent to the CP in length is to be inserted at least after each continuous transmission. In the system design, the integrity will be taken into consideration during the design of the CP, the GP and the length (number) of symbols in a symbol group. For example, in the design of one UpPTS plus one uplink subframe, in order to ensure the orthogonality of a downlink subframe following the uplink subframe or the data transmitted in the downlink subframe, the NPRACH can be transmitted in advance relative to the downlink. Further, the NPRACH can be additionally transmitted in advance relative to other uplinks. The UE can acquire the TA through one or more of the following configurations: the RRC signaling which indicates that the transmission time for the NPRACH is ahead by m time units (before the corresponding resource for UL transmission), the special subframe configuration, the TDD uplink-downlink configuration, the deployment mode, the preset TA value corresponding to the NPRACH format, the predefined fixed TA or more.

FIG. 22 and FIG. 23 show examples of acquiring the TA by the UE through the RRC signaling which indicates that the transmission time for the NPRACH is ahead by m time units (before the corresponding resource for UL transmission). Relative to the starting position of the UpPTS, the NPRACH is transmitted by additionally advancing by m time units (i.e., the TA value). This is done for the purpose that a GP equivalent to the CP in length can be obtained after the continuous uplink transmission.

Examples of acquiring, by the UE, the TA according to the special subframe configuration and the NPRACH format will be described below. Table 6 shows embodiments of the special subframe configuration. X can be configured to 2 or 4 by an RRC parameter in an SIB, so that the utilization rate of special subframes is increased. A GP with a length of at least one symbol needs to be ensured.

TABLE 6

Special subframe configuration in case of a normal CP

| Special subframe configuration | DwPTS | UpPTS |
|---|---|---|
| 0 | 6592 · $T_s$ | (1 + X) · 2192 · $T_s$ |
| 1 | 19760 · $T_s$ | |
| 2 | 21952 · $T_s$ | |
| 3 | 24144 · $T_s$ | |
| 4 | 26336 · $T_s$ | |
| 5 | 6592 · $T_s$ | (2 + X) · 2192 · $T_s$ |
| 6 | 19760 · $T_s$ | |
| 7 | 21952 · $T_s$ | |
| 8 | 24144 · $T_s$ | |
| 9 | 13168 · $T_s$ | |
| 10 | 13168 · $T_s$ | 13152 · $T_s$ |

Specifically, with regard to several NPRACH formats in Table 5 and the number of symbols in different UpPTSs:

(1) An UpPTS of one symbol plus one uplink subframe: for example, special subframe configurations 0 to 4 in Table 6, and X=0.

With regard to A1 in Table 5, a GP of 4480 Ts can be obtained only by a fixed TA NTA of 624 Ts for TDD, like the LTE, so that a cell radius approximate to 22 km is provided.

With regard to A2 in Table 5, the fixed TA for the NPRACH is to be adjusted from 62 Ts to NTA=2816 Ts, or an additional TA offset NTAoffset of 2192 Ts is added for the NPRACH, so that a cell radius approximate to 7.2 km can be provided.

With regard to A3 in Table 5, NTA=5008 Ts is to be set or NTAoffset=4384 Ts is to be additionally added, so that a cell radium of 12.5 km is provided.

With regard to A4 in Table 5, NTA=3952 Ts is to be set or NTAoffset=3328 Ts is to be additionally added.

(2) An UpPTS of two symbols plus one uplink subframe: for example, special subframe configurations 5, 6, 7, 8 and 9 in Table 6, and X=0.

Like A2 and A4 in the case of one symbol, 2*2192 Ts can be subtracted from the corresponding TA. With regard to A3, NTA=624 Ts can be directly used.

(3) An UpPTS of three symbols plus one uplink subframe: for example, special subframe configurations 0, 1 and 2 in Table 6, and X=2.

With regard to A2, A3 and A4, no additional TA is required. With regard to A3, the GP will be greater than the CP.

(4) An UpPTS of four symbols plus one uplink subframe: for example, special subframe configurations 5, 6 and 9 in Table 6, and X=2.

With regard to A2 and A4, the transmission can be performed directly, without needing an additional TA, or even NTA can be set as 0, i.e., NTA=0. With regard to A5, NTA=624 Ts can be used, and cells having a cell radius less than 3.3 km can be supported.

(5) An UpPTS of five symbols plus one uplink subframe: for example, special subframe configuration 0 in Table 6, and X=4.

With regard to A2, A4 and A5, the transmission can be performed directly. Or, with regard to A2, the fixed TA for the NPRACH is to be adjusted from 624 Ts to NTA=1184 Ts; or, by adding an additional TA offset NTAoffset of 560 Ts to the NPRACH, a cell radius approximate to 10 km can be provided.

(6) An UpPTS of six symbols plus one uplink subframe: for example, special subframe configurations 5 and 9 in Table 4, and X=0; or, the special subframe configuration 10.

A6 can be transmitted directly by a fixed TA of 624 Ts, and a cell radius of 8.6 km can be provided.

Or, for the transmission of the NPRACH format 0 in the FDD NB-IoT, the fixed TA for the NPRACH is to be adjusted from 624 Ts to NTA=1184 Ts; or, by adding additional TA offset NTAoffset of 560 Ts to the NPRACH, a cell radius approximate to 10 km can be provided.

Several time-frequency formats for the NPRACH transmission group have been provided above based on the subcarrier spacing of 3.75 kHz. The number of Ts for each symbol will change correspondingly if the subcarrier spacing changes. The number of symbols in each symbol group can be calculated according to the number of Ts of the uplink time-domain resource for the NPRACH and the number of symbol groups in the corresponding transmission unit. Furthermore, the corresponding CP, GP, the required TA and the size of the supported cell radius are derived.

In addition, in the foregoing embodiments, the NPRACH transmission uses the starting position of the UpPTS as a reference point, and the TA is described relative to the starting position of the UpPTS. Essentially, the count of Ts starts from the starting position of each system frame or subframe. For a special subframe, the actual reference point is a downlink subframe/time slot. In addition, the BS can directly configure the offset transmitted by the NPRACH (for example, through the RRC). The UE determines the starting time to transmit the NPRACH according to the offset. The reference time of the offset can be the starting position of a certain uplink or downlink subframe, or the starting position of a certain system frame, or the starting position of a certain symbol in a certain subframe (for example, the position of the UpPTS) or more. The reference time can be predefined in a protocol or configured by a BS (for example, RRC).

From the perspective of the system design, the protocol can define one or more NRPACH formats applicable to the TDD system, and the BS can directly configure an NPRACH format for a UE. Or, the UE determines an NPRACH format according to the special subframe configuration and/or the uplink-downlink configuration or more.

V. Calculation of RA-RNTI

In the process of interacting with a BS to complete random access, an RA-RANTI can be calculated by the UE according to one or more of the following parameters: the NRPACH format, the hyper frame number, the system frame, subframes, the uplink-downlink configuration or more. Preferably, the RA-RNTI is calculated according to the switching time between UL and DL or the configuration period of valid UL and DL subframes.

In Rel-13 and Rel-14 NB-IoT systems, the UE calculates the RA-RNTI in the following way:

$$RA\text{-}RNTI = 1 + \text{floor}(SFN\_id/4) + 256 * \text{carrier\_id}$$

where the Carrier-id denotes the ID (serial number) of a carrier, and SFN-id denotes the ID of a system frame. In an FDD system, the time to transmit one NPRACH is 5.6 ms or 6.4 ms. In a TDD system, due to discontinuous uplink transmission, the time to transmit one NPRACH channel is extended to 20 ms to 40 ms, according to different uplink subframe configurations. With regard to different NPRACH periods or switching periods of uplink and downlink subframes, different methods for calculating the RA-RNTI can be selected.

For example, with regard to the NPRACH symbol group transmission period of 5 ms or the uplink-downlink switching period of 5 ms:

$$RA\text{-}RNTI = 1 + \text{floor}(SFN\_id/16) + 64 * \text{carrier\_id}$$

With regard to the NPRACH symbol group transmission period of 10 ms or the uplink-downlink switching period of 10 ms:

$$RA\text{-}RNTI = 1 + \text{floor}(SFN\_id/32) + 32 * \text{carrier\_id}$$

In addition, if this adjustment is insufficient to meet the requirements on the RA-RNTI, the hyper frame number can be further imported in the calculation of the RA-RNTI, for example:

$$RA\text{-}RNTI = 1 + \text{floor}(SFN\_id/64) + \text{floor}(HFN\_id/4) + 32 * \text{carrier\_id}$$

where HFN-id is the ID of the hyper frame number.

In the TDD system, the UE can receive a downlink channel at an interval of transmitting the NPRACH in an uplink subframe. In the coverage-enhanced mode, the NPRACH needs to be repeatedly transmitted for multiple times. The BS detects each NPRACH transmission to detect the NPRACH and estimate a TA. For a UE under better channel conditions, the BS can successfully detect the NPRACH in advance and then obtain an accurate TA estimation. In this case, the BS can transmit a Random Access Response (RAR) in advance. For example, the starting position of an RAR window is defined on a downlink subframe before the repeatedly transmitted NPRACH. In the process of transmitting the NPRACH, a TDD UE or a Full Duplex FDD (FD-FDD) UE can monitor an NPDCCH used for indicating the RAR. If the UE has successfully detected an NPDCCH in response to the RA-RNTI scrambling and has successfully decoded the corresponding NPDSCH, the UE can stop transmitting the NPRACH in advance. Thus, the uplink transmission time can be reduced, and the power consumption of the UE is thus reduced.

VI. Transmission of Msg3 and Other Uplink Channels

In a TDD system, some uplink resources will be reserved for the NPRACH channel. In order to avoid the collision of an uplink channel with an NPRACH, an Msg3 can be transmitted in a carrier the same as or different from that for the NPRACH, wherein the position of the carrier which is used for transmitting the Msg3 is obtained by the RRC configuration from the BS, or predefined in the system, or indicated by an MAC CE (control element) (e.g., RAR). Similarly, other uplink channels can be scheduled to other uplink carriers for transmission through an RRC, an MAC or a DCI.

In addition, inter-carrier frequency hopping can be imported in the transmission of uplink channels. In one example, when the scheduling of the NPUSCH collides with the NPRACH, the NPUSCH will be hopped to another carrier. The another carrier is scheduled by an RRC. The NPUSC comprises a format 1 for transmitting data and/or a format 2 or 3 for transmitting uplink control information. If no additional carrier is configured, the transmission of the NPUSCH is postponed to a subsequent uplink subframe.

In addition, the timing relationship between the Msg3 and the RAR can be defined to start from the first valid uplink subframe (including or not including a special subframe) after 12 ms.

Figure 25:
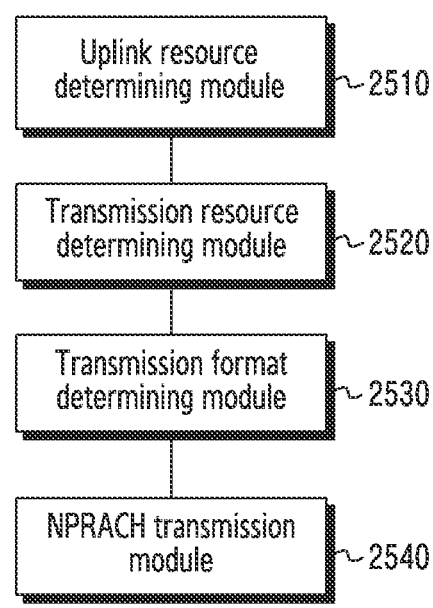
FIG. 25 is a module diagram of a UE according to the present disclosure.

FIG. 25 is a module diagram of a UE according to the present disclosure. Referring to FIG. 25, the UE includes an uplink resource determining module 2510, a transmission resource determining module 2520, a transmission format determining module 2530, and an NPRACH transmission module 2540.

The uplink resource determining module 2510 configured to determine a Time Division Duplex (TDD) uplink time-domain resource. The transmission resource determining module 2520 configured to determine, according to the TDD uplink time-domain resource, a time-domain resource used for transmitting a narrowband physical random access channel (NPRACH). The transmission format determining module 2530 configured to determine a time-domain format for an NPRACH transmission group, the time-domain format comprising: one NPRACH transmission group comprises a number of transmission units which are discontinuous in time domain, and one transmission unit comprises one or more NPRACH symbol groups which are continuous in time domain. The NPRACH transmission module configured to transmit, in the determined time-domain resource used for transmitting an NPRACH, an NPRACH transmission group in the time-domain format.

The operation processes of the uplink resource determining module, the transmission resource determining module, the transmission format determining module and the NPRACH transmission module correspond to the steps 1901, 1903, 1905 and 1907 in the method for requesting random access of the present disclosure, and will not be repeated here.

It can be seen from the detailed description of the present disclosure that, compared with the prior art, the present disclosure has at least the following beneficial technical effects:

firstly, by designing a time-domain format for NPRACH transmission according to the characteristics of TDD uplink time-domain resource, a random access process can be deployed within an LTE band or an LTE guard band and applied to an NB-IoT communication system based on TDD, so that the existing NB-IoT based on FDD can be applicable to the operation mode of TDD. Accordingly, a higher utilization rate of spectrum resources is achieved, and the system throughput and connection efficiency of the NB-IoT system in a scenario where a large number of UEs are to be connected are significantly improved;

secondly, by providing multiple methods for determining TDD uplink time-domain resource and a time-domain transmission position of the NPRACH, and by configuring the starting position of the time-domain transmission and the time-domain interval between transmission units by multiple approaches, for example, by the RRC signaling, the uplink-downlink subframe configuration, the uplink-downlink switching period or the NPRACH format, the application scenarios of the random access method are enriched, and the expansibility of the system is increased;

thirdly, by adding a timing advance before the time-domain position for transmitting the NPRACH, the inter-symbol interference is greatly reduced, the success probability of the random access is significantly improved, and the resource utilization and the random access performance of the UE are optimized;

fourthly, by improving the structure and length of an existing NPRACH symbol group to adapt to the frame structure and uplink-downlink configuration in the TDD mode, the method is applicable to TDD communication systems; and meanwhile, by designing multiple NPRACH formats, the flexibility of the random access resource configuration is improved, and the access efficiency is thus improved; and fifthly, the base station estimates a TA according to the time-frequency interval and frequency-domain interval between adjacent transmission units in the NPRACH transmission group in the time-domain format and then feeds back the TA to the UE, so that the accuracy of the TA estimation is greatly improved, and the success probability of the random access is increased.

It should be understood by those skilled in the art that the present disclosure involves devices for carrying out one or more of operations as described in the present disclosure. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), Read-Only Memory (ROM), Random Access Memory (RAM), Erasable Programmable Read-Only Memory (EPROM), Electrically Erasable Programmable Read-Only Memory (EEPROM), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams disclosed by the present disclosure are executed by computers or other processors of programmable data processing means.

It should be understood by those skilled in the art that the steps, measures and solutions in the operations, methods and flows already discussed in the present disclosure can be alternated, changed, combined or deleted. Further, other steps, measures and solutions in the operations, methods and flows already discussed in the present disclosure can also be alternated, changed, rearranged, decomposed, combined or deleted. Further, the steps, measures and solutions of the prior art in the operations, methods and operations disclosed in the present disclosure can also be alternated, changed, rearranged, decomposed, combined or deleted.

The foregoing descriptions are merely some implementations of the present disclosure. It should be noted that, to a person of ordinary skill in the art, various improvements and modifications can be made without departing from the principle of the present disclosure, and these improvements and modifications shall be regarded as falling into the protection scope of the present disclosure.

The invention claimed is:

1. A method performed by a user equipment (UE) in a wireless communication system, the method comprising:
    receiving, from a base station via a radio resource control (RRC) signaling, a system information block (SIB) for two uplink carriers in one cell, wherein the two uplink carriers include:
        a first uplink carrier corresponding to a downlink carrier in which a downlink synchronization signal is received, and
        a second uplink carrier different from the first uplink carrier; and
    transmitting, to the base station, an uplink signal on one of the two uplink carriers configured to the UE,
    wherein, in case of a frequency division duplex (FDD) system, the SIB includes first information for indicating a carrier position of the first uplink carrier,
    wherein, in case of a time division duplex (TDD) system, a center frequency of the first uplink carrier and a center frequency of the downlink carrier are same and the SIB does not include the first information for indicating the carrier position of the first uplink carrier, and
    wherein the SIB includes second information for indicating a carrier position of the second uplink carrier.

2. The method of claim 1, wherein an uplink transmission slot of the uplink signal is identified according to a time offset indicated by downlink control information (DCI) received from the base station.

3. The method of claim 1,
wherein a frequency-domain resource of the uplink signal is indicated from a frequency-domain resource set, by downlink control information (DCI) for physical downlink shared channel (PDSCH) received from the base station, and
wherein the frequency-domain resource set is configured for one of the two uplink carriers configured to the UE.

4. The method of claim 3, wherein the uplink signal comprises at least one of hybrid automatic repeat request acknowledgement (HARQ-ACK) information, scheduling request (SR) information, or channel state information (CSI).

5. The method of claim 1, wherein the transmitting of the uplink signal comprises:
in case that the uplink signal includes a hybrid automatic repeat request acknowledgement (HARQ-ACK) feedback of a physical downlink shared channel (PDSCH) associated with a message 4 (MSG 4) of a random access procedure, identifying the one of the two uplink carriers, which is was used for a physical random-random access channel (PRACH) transmission of the random access procedure.

6. A method performed by a base station in a wireless communication system, the method comprising:
transmitting, to a user equipment (UE) via a radio resource control (RRC) signaling, a system information block (SIB) for two uplink carriers in one cell, wherein the two uplink carriers include:
a first uplink carrier corresponding to a downlink carrier in which a downlink synchronization signal is transmitted, and
a second uplink carrier different from the first uplink carrier; and
receiving, from the UE, an uplink signal on one of the two uplink carriers configured to the UE,
wherein, in case of a frequency division duplex (FDD) system, the SIB includes first information for indicating a carrier position of the first uplink carrier,
wherein, in case of a time division duplex (TDD) system, a center frequency of the first uplink carrier and a center frequency of the downlink carrier are same and the SIB does not include the first information for indicating the carrier position of the first uplink carrier, and
wherein the SIB includes second information for indicating a carrier position of the second uplink carrier.

7. The method of claim 6, wherein an uplink transmission slot of the uplink signal is associated with a time offset indicated by downlink control information (DCI) transmitted to the UE.

8. The method of claim 6,
wherein a frequency-domain resource of the uplink signal is indicated from a frequency-domain resource set, by downlink control information (DCI) for physical downlink shared channel (PDSCH) transmitted to the UE, and
wherein the frequency-domain resource set is configured for one of the two uplink carriers configured to the UE.

9. The method of claim 8, wherein the uplink signal comprises at least one of hybrid automatic repeat request acknowledgement (HARQ-ACK) information, scheduling request (SR) information, or channel state information (CSI).

10. The method of claim 6, wherein, in case that the uplink signal includes a hybrid automatic repeat request acknowledgement (HARQ-ACK) feedback of a physical downlink shared channel (PDSCH) associated with a message 4 (MSG 4) of a random access procedure, the one of the two uplink carriers, which was used for a physical random access channel (PRACH) reception of the random access procedure, is configured for the uplink signal.

11. A user equipment (UE) in a wireless communication system, the UE comprising:
a transceiver; and
at least one processor coupled with the transceiver and configured to:
receive, from a base station via a radio resource control (RRC) signaling, a system information block (SIB) for two uplink carriers in one cell, wherein the two uplink carriers include:
a first uplink carrier corresponding to a downlink carrier in which a downlink synchronization signal is received, and
a second uplink carrier different from the first uplink carrier, and transmit, to the base station, an uplink signal on one of the two uplink carriers configured to the UE,
wherein, in case of a frequency division duplex (FDD) system, the SIB includes first information for indicating a carrier position of the first uplink carrier,
wherein, in case of a time division duplex (TDD) system, a center frequency of the first uplink carrier and a center frequency of the downlink carrier are same and the SIB does not include the first information for indicating the carrier position of the first uplink carrier, and
wherein the SIB includes second information for indicating a carrier position of the second uplink carrier.

12. The UE of claim 11, wherein an uplink transmission slot of the uplink signal is identified according to a time offset indicated by downlink control information (DCI) received from the base station.

13. The UE of claim 11,
wherein a frequency-domain resource of the uplink signal is indicated from a frequency-domain resource set, by downlink control information (DCI) for physical downlink shared channel (PDSCH) received from the base station, and
wherein the frequency-domain resource set is configured for one of the two uplink carriers configured to the UE.

14. The UE of claim 13, wherein the uplink signal comprises at least one of hybrid automatic repeat request acknowledgement (HARQ-ACK) information, scheduling request (SR) information, or channel state information (CSI).

15. The UE of claim 11, wherein the at least one processor, to transmit the uplink signal, is configured to:
in case that the uplink signal includes a hybrid automatic repeat request acknowledgement (HARQ-ACK) feedback of a physical downlink shared channel (PDSCH) associated with a message 4 (MSG 4) of a random access procedure, identify the one of the two uplink carriers, which was used for a physical random access channel (PRACH) transmission of the random access procedure.

16. A base station in a wireless communication system, the base station comprising:
a transceiver; and
at least one processor coupled with the transceiver and configured to:
transmit, to a user equipment (UE) via a radio resource control (RRC) signaling, a system information block (SIB) for two uplink carriers in one cell, wherein the two uplink carriers include:
  a first uplink carrier corresponding to a downlink carrier in which a downlink synchronization signal is transmitted, and
  a second uplink carrier different from the first uplink carrier, and
receive, from the UE, an uplink signal on one of the two uplink carriers configured to the UE,
wherein, in case of a frequency division duplex (FDD) system, the SIB includes first information for indicating a carrier position of the first uplink carrier,
wherein, in case of a time division duplex (TDD) system, a center frequency of the first uplink carrier and a center frequency of the downlink carrier are same and the SIB does not include the first information for indicating the carrier position of the first uplink carrier, and
wherein the SIB includes second information for indicating a carrier position of the second uplink carrier.

17. The base station of claim 16, wherein an uplink transmission slot of the uplink signal is associated with a time offset indicated by downlink control information (DCI) transmitted to the UE.

18. The base station of claim 16,
wherein a frequency-domain resource of the uplink signal is indicated from a frequency-domain resource set, by downlink control information (DCI) for physical downlink shared channel (PDSCH) transmitted to the UE, and
wherein the frequency-domain resource set is configured for one of the two uplink carriers configured to the UE.

19. The base station of claim 18, wherein the uplink signal comprises at least one of hybrid automatic repeat request acknowledgement (HARQ-ACK) information, scheduling request (SR) information, or channel state information (CSI).

20. The base station of claim 16, wherein, in case that the uplink signal includes a hybrid automatic repeat request acknowledgement (HARQ-ACK) feedback of a physical downlink shared channel (PDSCH) associated with a message 4 (MSG 4) of a random access procedure, the one of the two uplink carriers, which was used for a physical random access channel (PRACH) reception of the random access procedure, is configured for the uplink signal.

* * * * *